US008924677B2

(12) United States Patent
Pronovost et al.

(10) Patent No.: US 8,924,677 B2
(45) Date of Patent: *Dec. 30, 2014

(54) MEMORY MANAGEMENT TECHNIQUES

(71) Applicant: Microsoft Corporation, Redmond, WA (US)

(72) Inventors: Steve Pronovost, Woodinville, WA (US); Maxwell Abernethy, San Francisco, CA (US); Rudolph Balaz, Redmond, WA (US); Ameet Chitre, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/148,738

(22) Filed: Jan. 7, 2014

(65) Prior Publication Data

US 2014/0192074 A1   Jul. 10, 2014

Related U.S. Application Data

(63) Continuation of application No. 13/230,109, filed on Sep. 12, 2011, now Pat. No. 8,627,036.

(51) Int. Cl.
*G06F 12/02* (2006.01)
*G09G 5/00* (2006.01)

(52) U.S. Cl.
CPC ............... *G06F 12/02* (2013.01); *G09G 5/001* (2013.01)
USPC ........... 711/166; 711/156; 711/158; 711/159; 345/535; 345/543

(58) Field of Classification Search
USPC ........... 711/166, 156, 158, 159; 345/535, 543
See application file for complete search history.

(56) References Cited

U.S. PATENT DOCUMENTS

| 5,928,365 | A | | 7/1999 | Yoshida |
| 5,999,528 | A | * | 12/1999 | Chow et al. .................. 370/365 |
| 6,021,132 | A | * | 2/2000 | Muller et al. ................ 370/412 |
| 6,081,505 | A | * | 6/2000 | Kilkki ........................... 370/230 |
| 6,229,822 | B1 | * | 5/2001 | Chow et al. .................. 370/474 |

(Continued)

OTHER PUBLICATIONS

"AppSense Performance Manager: Memory Control and Optimization," Copyright Dates: 2000-2008; Retrieved Date: Jun. 24, 2011; pp. 1-16; AppSense Incorporated.

(Continued)

*Primary Examiner* — Stephen Elmore
(74) *Attorney, Agent, or Firm* — Tim Churna; Raghu Chinagudabha; Micky Minhas

(57) ABSTRACT

Memory management techniques that permit an executing process to store content in memory and later retrieve that content from the memory, but that also permit a memory manager to discard that content to address memory pressure. A process executing on a computing device may notify a memory manager of the computing device that first memory space allocated to the process contains first content that is available for discard. If the memory manager detects the computing device is experiencing memory pressure, the memory manager may address the memory pressure by selecting memory space available for discard and discarding the content of the memory space. Before a process reuses content made available for discard, the process may notify the memory manager of the intent to reuse and, in response, receive empty memory and an indication that the content was discarded or receive an indication that the content is still available for use.

20 Claims, 10 Drawing Sheets

(56) References Cited

U.S. PATENT DOCUMENTS

| | | | |
|---|---|---|---|
| 6,269,081 B1 * | 7/2001 | Chow et al. | 370/241 |
| 6,282,621 B1 | 8/2001 | Parsons | |
| 6,408,313 B1 | 6/2002 | Campbell et al. | |
| 6,557,056 B1 * | 4/2003 | Lanteigne et al. | 710/52 |
| 6,947,051 B2 | 9/2005 | Gossalia et al. | |
| 6,950,919 B2 * | 9/2005 | Sharma et al. | 711/170 |
| 7,035,771 B2 | 4/2006 | Butt et al. | |
| 7,082,500 B2 * | 7/2006 | Scott et al. | 711/141 |
| 7,409,505 B2 * | 8/2008 | Scott et al. | 711/141 |
| 7,475,093 B2 * | 1/2009 | Tomic et al. | 1/1 |
| 7,673,304 B2 * | 3/2010 | Gosalia et al. | 718/102 |
| 7,769,974 B2 * | 8/2010 | Bhansali et al. | 711/170 |
| 7,933,283 B1 * | 4/2011 | Liu et al. | 370/412 |
| 2004/0193783 A1 * | 9/2004 | Sharma et al. | 711/104 |
| 2010/0169536 A1 * | 7/2010 | Shedel et al. | 711/6 |
| 2010/0250868 A1 * | 9/2010 | Oshins | 711/154 |
| 2011/0093854 A1 * | 4/2011 | Blanc et al. | 718/101 |
| 2012/0271845 A1 * | 10/2012 | Netz et al. | 707/769 |
| 2012/0324196 A1 * | 12/2012 | Maillet et al. | 711/170 |
| 2012/0324197 A1 * | 12/2012 | Spradlin et al. | 711/170 |
| 2012/0324198 A1 * | 12/2012 | Spradlin et al. | 711/170 |

OTHER PUBLICATIONS

"Graphics: Intel(c) 82915G/82910GL Express Chipset Family: Dynamic Video Memory Technology (DMVT 3.0) questions and answers;" "Last Modified" Date: Apr. 20, 2011; "Date Created" Date: May 19, 2004; pp. 1-3; Intel Corporation.

Gidenstam, Anders et al.; "Efficient and Reliable Lock-Free Memory Reclamation Based on Reference Counting;" Proceedings of the 8th International Symposium on Parallel Architectures, Algorithms and Networks (ISPAN'05); Dec. 7-9, 2005; pp. 202-207; IEEE Computer Society; Las Vegas, NV.

Withington, P.T.; "Memory Management;" Published Mar. 13, 2001; pp. 1-33; Callitrope; Cambridge, MA.

* cited by examiner

MEMORY MANAGEMENT TECHNIQUES

CROSS-REFERENCE TO RELATED APPLICATION(S)

This application is a continuation of U.S. patent application Ser. No. 13/230,109, filed Sept. 12, 2011, now U.S. Pat. No. 8,627,036, issued Jan. 7, 2014, entitled "MEMORY MANAGEMENT TECHNIQUES". The entirety of this afore-mentioned application is incorporated herein by reference.

BACKGROUND

When multiple processes are executing on a computing device, the processes share the hardware resources of the computing device. Successful execution of all processes requires that no process use so much of any resource that other processes are unable to obtain enough of that resource to execute effectively. Among the hardware resources that can impact effective execution is memory of the computing device.

A computing device may have two types of memory, which can be termed "fast memory" and "slow memory." Fast memory is termed "fast" because exchanging information between fast memory and a processor is relatively quick as compared to exchanging information between slow memory and a processor. Fast memory includes memory that is directly accessible by a processor (e.g., a central processing unit (CPU) or a graphics processing unit (GPU)). Fast memory of a device may include "internal memory" and can be implemented as random access memory (RAM). Slow memory includes memory that is not directly accessible by a processor, but is instead installed in a computing device remote from a processor. Slow memory of a device may include secondary storage and can be implemented as one or more storage drives. Examples of storage drives include hard disk drives and solid-state drives (SSDs).

Computing devices typically include a memory manager that determines how processes will use memory. A process may request from the memory manager one or more blocks of memory space and the memory manager may allocate to each executing process memory space consisting of a range of memory addresses for that process to use. Once the memory space is allocated, the process can write data to and read data from memory using addresses in its assigned range of addresses. When the process finishes using the memory, the process can again interact with the memory manager to request that the memory space be de-allocated or "freed" so that the memory space is available for use by another process.

Because of the speed advantage of fast memory, when processes are interacting with content stored in memory, the content is placed in fast memory. However, the total amount of memory requested by all processes executing on a computing device may be greater than the amount of fast memory available on the computing device. To counter this problem, it is known for memory managers to us a technique called "paging." Using paging, content that a process has requested be stored can be temporarily stored in slow memory.

In paging, the ranges of memory addresses assigned to processes may be divided into pages. When a process reads or writes content to memory, the "page" containing that content is loaded in the fast memory. Though, when the page is not actively being accessed by a process, the memory manager may keep the content from the page in a page file in slow memory. A memory manager, for example, may move a page used by a process out of fast memory and store the page in the page file in slow memory, to allow space in the fast memory to be made available for storing other content (and other pages) that are actively being accessed by other processes. When a process needs to use content that has been placed into slow memory, the memory manager can retrieve the page containing the content from the page file in the slow memory and place the page and the content back in fast memory.

As mentioned above, a memory manager will allocate memory space containing a range of addresses of memory to a process upon receiving from the process a request for memory. The range of addresses provided to the process are not hardware addresses of fast memory. This is because, when paging is used, the exact location at which content can be accessed in fast memory is not known at the time the memory space and the range of addresses is allocated. Instead, memory space in "virtual memory" is allocated to a process in response to a request for memory, and "virtual addresses" are provided to the process. The total amount of virtual memory available on a computing device is the sum of the size of fast memory and the maximum permitted size of the page file in slow memory.

Virtual memory addresses are known to the memory manager and can be used by the memory manager to identify the actual locations in memory at which content is stored. A virtual memory address may correspond to an address of fast memory or to a location in the page file in slow memory. When a request to access a particular virtual memory address is received by the memory manager, the memory manager may review records regarding the virtual memory to determine an actual storage location corresponding to the virtual memory address. When the virtual memory address corresponds to a location in the page file in slow memory, the memory manager may retrieve the page containing the virtual memory address from the slow memory and write the page to fast memory. This may include removing another page from the fast memory to make space in fast memory for the page to be written and placing that other page in the page file of slow memory, then updating the actual storage locations of both in records regarding the virtual memory addresses.

Accordingly, a process may interact with a memory manager to perform various functions regarding the memory. A process may first request an allocation of memory, in which case the memory manager may "allocate" to the process an amount of memory space in virtual memory. When the process is interacting with content stored in memory space, the memory manager may ensure that the content is stored in fast memory, and the memory manager may place the content in the page file in slow memory when the process is not interacting with the content. The process may also request that the memory manager "de-allocate" memory space in virtual memory that was previously allocated if the process will not use the contents of that memory space again. If the process later requires additional memory to store newly generated content, the process can request another allocation of memory space in virtual memory.

Interactions with the memory manager, particularly the memory manager's allocation and de-allocation operations, can take a relatively long time for a process and therefore can slow down execution of a process. Because of this, when software designers write the code that defines the processes, the developers may try to reduce the number of allocation and de-allocation operations that are performed by the processes. The software designers may instead use memory "reset" operations in their code when memory space allocated to that process contains content that is not to be further used by the process. Upon receiving an instruction to "reset" specified memory space, if pages for that memory space are stored in the fast memory, the memory manager stops preserving the content of the memory space in the fast memory, such as by not writing content of the memory space into the page file when a page in fast memory is to be replaced with another page. No de-allocation of memory space is performed in response to a "reset." Though there is no content (and possibly no pages) corresponding to the memory space following a reset of that memory, that memory space of virtual memory continues to be allocated to the process. By retaining the allocation, the memory space will already be available to the process when the process needs memory for some purpose in the future, without the need for a subsequent allocation operation. In this way, the process can avoid lengthy allocation and de-allocation operations. Also, because the content of the reset memory space is not occupying valuable space in the fast memory that can be used by other pages storing content for other memory space, the memory manager is not wasting time or resources managing that content using paging techniques.

SUMMARY

Applicants have recognized and appreciated the advantages of allowing an executing process to notify a memory manager that space in virtual memory stores content that is available to be discarded. A memory manager may then conditionally discard that content, depending on memory requests of other processes, such as by removing the content from fast memory and not preserving the content when other content is to be written to fast memory. If the content has not been discarded when the process subsequently encounters an operation using that content, the process may reclaim the content and prevent discard.

In conventional scenarios in which processes are not able to make content available for discard and not able to reclaim that content, software developers were likely to write code such that processes permanently retain memory space having content that has only a slight chance of being used again. Retaining such content can lead to fast memory being filled with such unused content, which can be one cause of memory pressure in a computing device. By providing an ability for a process to signal to a memory manager that the content can be discarded, processes may gain the speed advantage of caching more contents in memory, while a memory manager may gain the ability to discard such contents if memory pressure is detected. This may lead to memory in a computing system being more efficiently used.

In some embodiments, a process executing on a computing device notifies a memory manager of a computing device that a first memory space allocated to the process contains first content available for discard. At some later time, the process may then notify the memory manager that the process intends to use the first content stored in the first memory space. The memory manager may maintain a record of allocated memory space for which contents are available for discard and not required to be preserved. The memory manager may also detect when a computing device is experiencing memory pressure and, in response, select first memory space from the record and cease to preserve the content of the first memory. When the memory manager receives from a process a notification that the process intends to reuse content previously marked as eligible for discard, then the memory manager may determine whether the content was discarded. If the content was not discarded, the memory manager may make the content available to the process. However, if the content was discarded, then the memory manager may instead make empty memory space available to the process and inform the process that the content was discarded.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
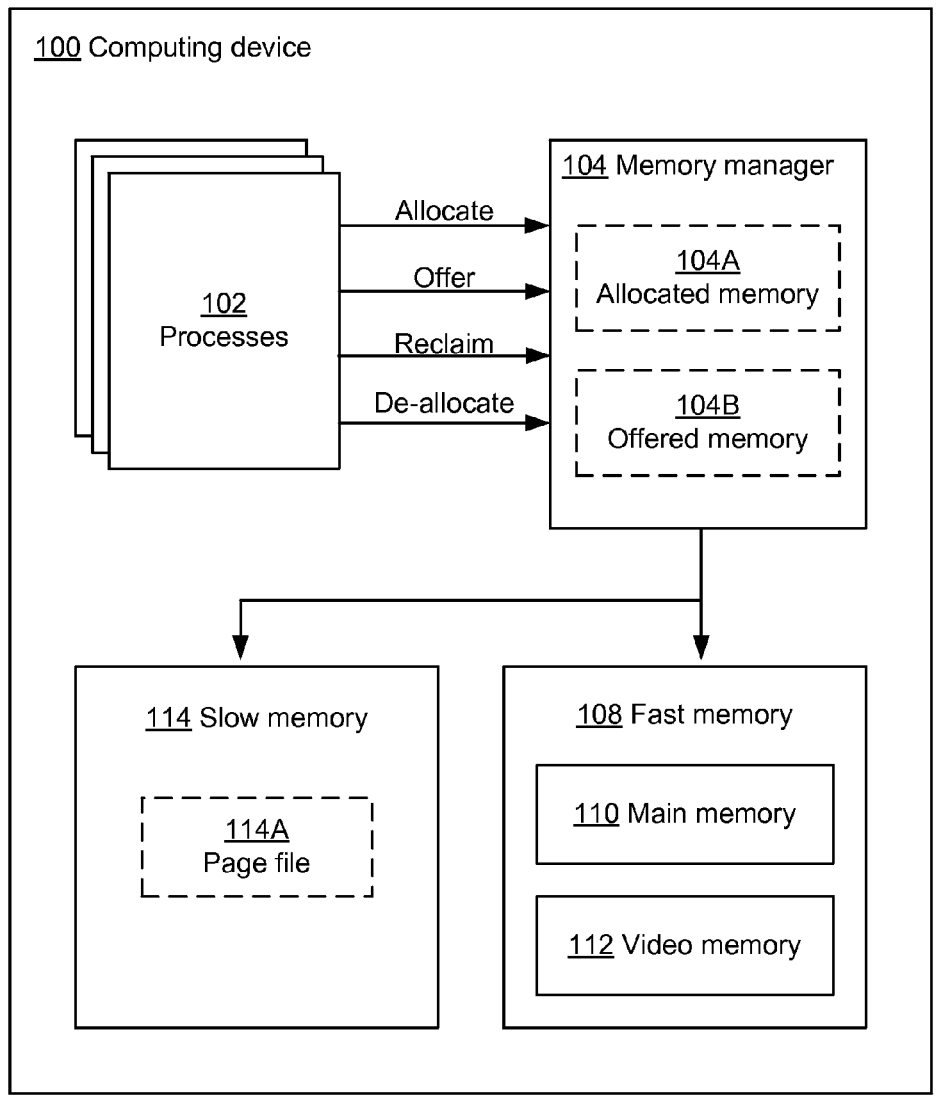
FIG. 1 is a block diagram of an example of a computing environment in which some embodiments may operate.

Applicants have recognized and appreciated the advantages of memory management techniques that permit an executing process (also referred to more simply as a "process" herein) to store content in memory and later retrieve that content from the memory, but that also permit a memory manager to discard that content before the content is retrieved. Such techniques would enable the memory manager to address incidents of memory pressure more effectively by discarding some content, such as that stored in fast memory, that is not necessary to preserve, while also allowing processes to avoid needing to regenerate content that has not been discarded.

Accordingly, described herein are techniques for notifying a memory manager that allocated memory space of virtual memory of a computing device contains content that can be discarded and for subsequently notifying the memory manager of an intent to reuse the content in the memory space so as to prevent later discarding of that content. Additionally described are techniques for operating a memory manager to manage memory in response to such notifications and to detect and address memory pressure by discarding contents stored in fast memory and associated with the memory space indicated to be available for discard. In some embodiments operating in accordance with techniques described herein, when memory space is made available for discard and/or when a memory manager discards content of memory space, the memory space of virtual memory may continue to be allocated to a process. Because the memory space continues to be allocated, if content has been discarded the process can regenerate the content when needed and store the content in the previously-allocated memory space, without needing to perform an allocation operation.

Applicants have recognized and appreciated that processes often do not use memory efficiently, which can lead to memory pressure and an accompanying slowdown of execution of processes on a computing device. One of the ways in which executing processes do not use memory efficiently is by storing in memory content that the process is not certain will be used again or not certain will be used again soon, but that can be regenerated later if needed. For example, a process may store in memory a computer graphic that is not certain to be displayed again in an interface, such as an image of a web page that is shown in an inactive web browser tab. The process may not know if or when a user may request to view the web page of that tab. Additionally, the images of the web page can be regenerated for use, such as by retrieving the images from a storage drive or from the web. An efficient way to use memory would be to remove contents such as these from memory, such that valuable memory space is not wasted storing these contents and such that the memory manager does not waste time preserving those contents through paging techniques. Conventional processes, however, often do not manage memory in a way that is efficient for overall use of the memory, but instead manage memory in a way that is efficient only for that process. Thus, rather than removing contents from memory, many processes leave contents in memory such that the contents can be retrieved quickly if needed again. When processes leave content in memory in this way, though, a computing device can experience memory pressure. Memory pressure can occur under various conditions, including when a computing device's fast memory contains more than a threshold amount of content and the memory manager must "page" content into slow memory of the computing device to make room in the fast memory for other contents to be stored.

Applicants have further recognized and appreciated that these inefficiencies in memory management arise because current techniques limit a process to either requesting that contents be preserved or requesting that contents be erased through a de-allocation operation or a memory reset operation. Memory may be more efficiently used, however, if a better balance could be struck between the needs of processes to store information and the need of memory managers to manage efficient use of memory. Applicants have recognized and appreciated that such a better balance could be achieved if processes were able to notify a memory manager that the memory manager is not required to preserve content the process is storing in memory space allocated to the process. More particularly, Applicants have recognized the benefits of enabling processes to "offer" to the memory manager that the memory manager could discard content of specified memory space at some point in the future if the memory manager is to address memory pressure. To address memory pressure, for example, the memory manager could discard content that is stored in fast memory. Discarding such content would free some of the fast memory to hold other content that is being used by processes. Discarding such content would also reduce the need to perform paging to place this other content in the fast memory, which could result in faster execution times for other operations.

Applicants have further recognized that designers of processes may more readily offer memory in this way if the processes could later "reclaim" contents for use, if the contents have not yet been discarded by the memory manager, when processes subsequently need to use the contents. Such a technique would both enable processes to store contents long-term in memory space in case the contents could be used again, thereby realizing the advantages of caching more data, and enable the memory manager to address memory pressure by discarding some contents that are available for discard.

Described below are examples of various techniques that may be used in embodiments for "offering" memory space to a memory manager so as to make the content of the memory space available for discard and for "reclaiming" contents of previously-offered memory space. Also described are various techniques for operating a memory manager to manage memory in response to such offer and reclaim operations and to address memory pressure by discarding content present in fast memory and that has been indicated as available for discard. It should be appreciated, however, that each of the techniques described below are merely illustrative of techniques that may be implemented in accordance with principles described herein, and that embodiments are not limited to implementing the techniques described below.

FIG. 1 is a block diagram of elements of one computing device 100 with which some embodiments may operate. Examples of computing devices with which embodiments may operate include client computers, such as laptop or desktop personal computers, mobile phones, and personal digital assistants (PDAs), and server computers, such as single servers and systems of interconnected computers cooperating and sharing processing power. It should be appreciated, though, that embodiments are not limited to operating with any particular type or types of computing devices.

In the example of FIG. 1, computing device 100 includes one or more executing processes 102, each of which interacts with a memory manager 104 to use memory of the computing device 100. The processes 102 may be any suitable processes, including processes associated with application software, system software, and/or any other type of software. In some cases, the processes 102 may include processes associated with graphics drivers or with graphics libraries for rendering text and/or images to a display screen. Each of the processes 102 is associated with processor-executable instructions and are executed by one or more processors of the computing device 100. The processors may include central processing units (CPUs), graphics processing units (GPUs), and/or any other suitable structure for executing instructions.

The memory manager 104 manages the allocation and use of fast memory 108 of the computing device 100 through any suitable memory management techniques. Such memory management techniques may include known techniques for allocating memory space of virtual memory and ensuring content stored in memory space is available in fast memory 108 and accessible to processes 102 when requested. The memory manager 104 may manage any suitable one or more fast memories 108 of the computing device 100, including system memory 110 and video memory 112. Memory manager 104 may also make use of one or more slow memories 114 of the computing device 100 as part of employing paging techniques with fast memory 108. For example, some content of fast memory 108 may be written to the page file 114A. Fast memories 110, 112 and slow memory 114 may be implemented in any suitable manner, as embodiments are not limited in this respect. In some cases, the fast memory 108, including fast memories 110, 112, may be one or more random access memories (RAMs) and the slow memory 114 may be a magnetic disk storage (e.g., a hard disk drive) or a solid-state drive (SSD). The fast memory 108 may store any suitable information. In embodiments where fast memory 108 includes multiple memories, each memory may store particular types information for which it has been assigned responsibility. For example, system memory 110 may store processed data like intermediate or final results of calculations and video memory 112 may store information regarding graphics to be displayed in an interface.

To use memory of the computing device 100, the processes 102 may carry out a series of interactions with the memory manager 104, some of which interactions are illustrated in FIG. 1. Each of these interactions may be carried out in any suitable manner, including through one or more Application Programming Interface (API) calls. To store an amount of data in memory, a process 102 may first request that the amount of memory be allocated to the process 102 for storing the data. When a request to allocate memory is received by the memory manager 104, the memory manager 104 may, if the requested amount of memory space is available in virtual memory, update the record 104A of allocated memory to indicate that the requested amount of memory is allocated and make that amount of memory space in virtual memory available to the process 102 for use. The record 104A may also be updated with virtual memory addresses for memory space granted to the process 102 in response to the request for the allocation. Updating the record 104A with the amount of allocated space allows the memory manager to ensure that no more than the total available memory is allocated at any time, where the total memory is the combined size of the fast memory 108 and the page file 114A. Updating the record 104A with the memory addresses also allows the memory manager 104 to track what process is using what memory. In addition to allocation operations, the interactions between processes 102 and the memory manager 104 may include de-allocation operations. Once the process 102 is finished using previously-requested and allocated memory space, the process 102 may request that the memory manager 104 de-allocate the memory space. When the memory is de-allocated, the memory space is no longer available to the process 102 and is made available for allocation to other processes. Upon receiving a de-allocation request, the memory manager 104 may also update the record 104A to indicate that the amount of memory space is available and that the memory space corresponding to that amount of memory is no longer allocated.

In the time between requests for allocation and de-allocation, the process 102 may perform various other interactions with the memory manager 104 to interact with allocated memory space. Such interactions may include requests to access previously-allocated memory space for writing information to or reading information from the previously-allocated memory space. In accordance with techniques described herein, other interactions may include "offer" and "reclaim" operations. A process 102 and memory manager 104 may carry out techniques described herein, including illustrative techniques described below in connection with FIGS. 2-9, to perform the offer and reclaim operations.

Another role of the memory manager 104 may be to address instances of memory pressure in the computing device 100. "Memory pressure" can be associated with any suitable conditions of memory of the computing device 100, as embodiments are not limited to operating with any particular type or cause of memory pressure. Examples of conditions associated with memory pressure are discussed in detail below in connection with FIG. 5. In some embodiments, memory manager 104 may detect an incident of memory pressure when the fast memory 108 of computing device 100 is in a state that more memory space has been allocated than can be stored at one time in fast memory 108 at one time. Using conventional procedures, when such conditions triggered memory pressure, the memory manager 104 would have only engaged in paging to move some content of fast memory 108 to the page file 114A. In accordance with techniques described herein, however, the memory manager 104 may additionally or alternatively address instances of memory pressure by discarding content that one or more processes 102 have indicated, through an offer operation, is available for discard.

The process 102 performs an offer interaction when the process 102 wishes to "offer" to the memory manager 104 that the manager 104 may discard the contents of memory space as part of addressing memory pressure. As discussed in detail below, when a process 102 has stored content in previously-allocated memory space, but the process 102 does not know whether or when the content may be used again, or the process 102 knows that the content will not be used again within a certain threshold period of time, the process 102 may signal the memory manager 104 that the content of the allocated memory space is available for discard. To offer memory, the process 102 may carry out an offer interaction, such as by making an offer API call, that identifies the memory space to be offered. The memory to be offered may be identified in any suitable manner, including through explicitly identifying virtual memory addresses for the memory space or by providing a pointer to or and identifier for the content and/or the memory space. The memory manager may maintain a record 104B of memory space that has been offered, such as by adding memory addresses of offered memory space to the record 104B. Once one or more processes 102 offer memory space, if the memory manager 104 detects that the computing device 100 is experiencing memory pressure, then as part of addressing the memory pressure the memory manager 104 may select content from the record 104B of offered memory space and discard the content stored in that memory space. For example, the memory manager 104 may select content stored in fast memory 108 and discard that content to address memory pressure.

In some embodiments, when the memory manager 104 receives an offer interaction or when the memory manager 104 discards content, the memory manager 104 may not change an allocation of memory of the computing device 100 or update the record 104A of allocated memory. Instead, the memory manager 104 may maintain memory allocation despite the offer interaction and even despite discard. The memory manager may maintain the allocation because the "offer" interaction from the process 102 may not immediately result in the memory manager discarding the content; rather, the content may be preserved indefinitely. Maintaining the allocation of memory through the offer interaction ensures that the record 104A matches the actual use of the memory. Maintaining the allocation of memory despite a discard of the contents ensures that the previously-allocated memory space remains available to the process 102 performing the offer. An offer implies to the memory manager 104 that the process 102 may not need content of specified memory now, but also implies that the content could be needed at some later time. To ensure the process 102 is able to store and use the content at that later time—even if the content was discarded and must be regenerated before use by the process 102—the memory manager 104 continues to allocate the memory space to the process 102. Though, embodiments are not limited to operating in this manner and, in some embodiments, a discard of contents may also result in a de-allocation of memory space.

In addition to offer interactions, a process 102 may also interact with the memory manager 104 to carry out a reclaim operation. At any point after the process 102 has indicated to the memory manager 104 that content of specified memory space is available for discard, the process 102 may need to use the content of the memory space. Because the content was made available for discard, the process 102 should not simply begin accessing the memory space in which the content was stored, as the content may have been discarded. Instead, the process 102 carries out a reclaim operation to indicate to the memory manager 104 that the process 102 intends to reuse the content, to make the content of the specified memory space no longer available for discard, and to request that the memory manager 104 inform the process 102 of whether the content is still available. If the content is still available, the memory manager 104 may ensure that the content is available in fast memory 108 (rather than in the page file 114A) and inform the process 102 that the content is available for use. When the content was discarded by the memory manager 104, the memory manager 104 may instead respond to the process 102 that the content is no longer available and make available to the process 102 empty memory space in which to store the content once the process 102 regenerates the content.

In the discussion of the offer operation above, the memory manager was described as updating a record 104A to indicate what memory space has been made available for discard through such an operation. The memory manager may also update such records upon a reclaim operation. Regardless of whether the content has been discarded, when a reclaim operation is carried out for specified memory space, record 104A may be updated to reflect that the specified memory space is no longer available for discard. This can ensure that, if the content was not discarded, the content will not be discarded following the reclaim, and ensure that, if the content was discarded, regenerated content will not be discarded.

As mentioned above, examples of ways in which some processes and memory managers may implement "offer" and "reclaim" operations are discussed in detail below in connection with FIGS. 2-9.

It should be appreciated that embodiments that operate with computing devices according to the example of FIG. 1 are not limited to implementing the device 100 or any elements thereof in any particular manner. For example, the memory manager 104 may be implemented in any suitable way, including as a stand-alone memory manager, as a memory manager integrated with an operating system of the computing device 100, or as a memory manager integrated with graphics software and/or hardware of the computing device 100, like a memory manager integrated with a graphics interface of the computing device 100. Further, while system memory 110 and video memory 112 are illustrated separately in FIG. 1 and are discussed separately in this example, it should be appreciated that in some cases the memories 110, 112 may be embodied together. For example, in some embodiments the system memory 110 and video memory 112 may be implemented together as parts of a single integrated memory. Alternatively, some embodiments may not include or may not operate with either the system memory 110 or video memory 112, or may operate with additional or alternative types of memory, as embodiments are not limited to operating with any types of memory.

In addition, while the memory manager 104 was discussed as handling each of the system memory 110 and video memory 112, it should be appreciated that memory manager 104 may be implemented as a single manager or as multiple different managers having divided responsibility. For example, a first memory manager may be implemented for the system memory 110 and a second memory manager may be implemented for the video memory 112. Each of the memory managers may implement techniques described herein, such as by handling allocation, offer, reclaim, and de-allocation operations for the respective memories. Alternatively, where a single memory manager is implemented, the single memory manager may manage memory separately, such as by maintaining separate records of allocation and offers for the memory 110 and the memory 112 and/or by maintaining separate page files for the memory 110 and memory 112.

Figure 2:
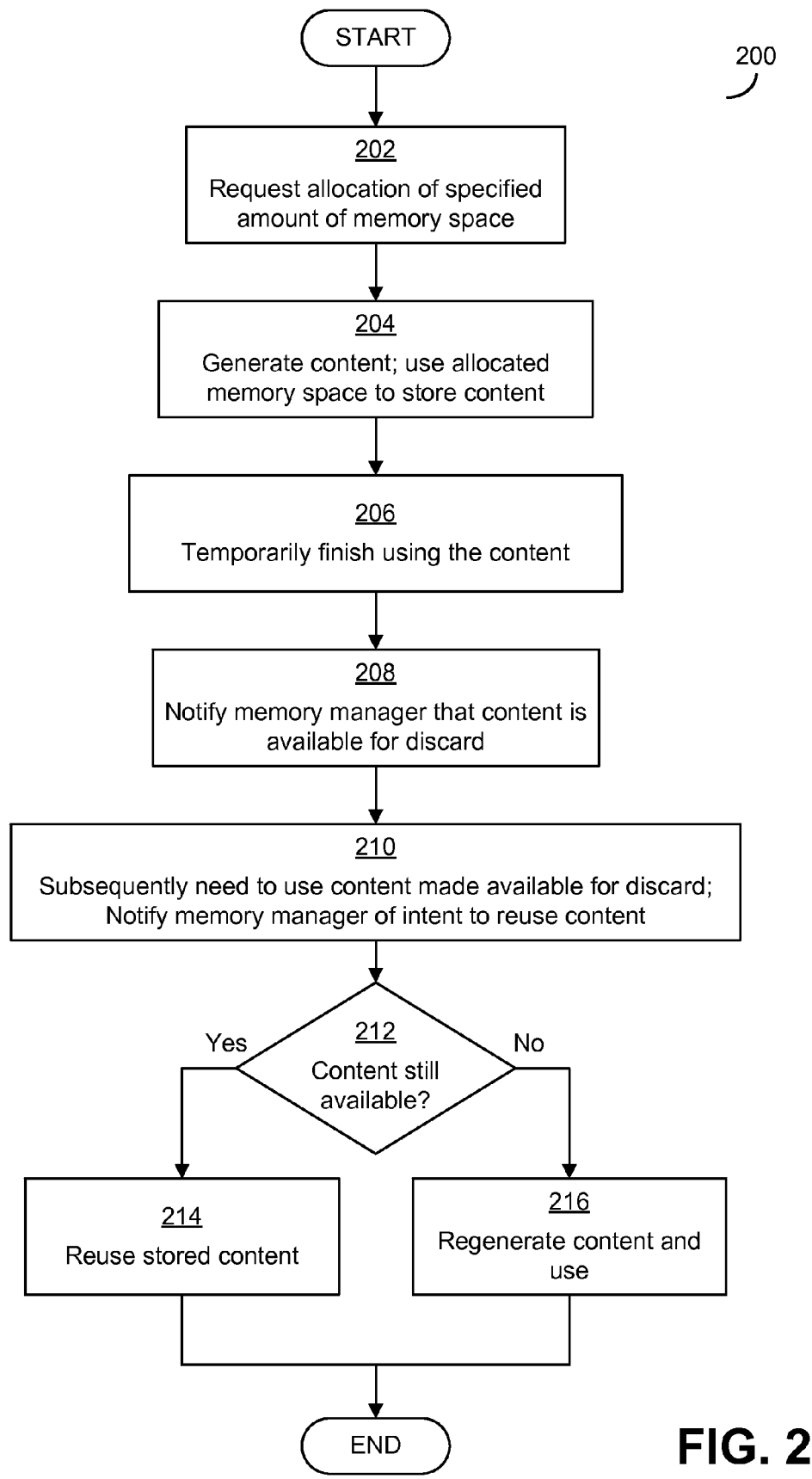
FIG. 2 is a flowchart of an example of a technique that may be implemented by an executing process for managing memory reserved by the process.

In the example of FIG. 2 and in other examples below, techniques are described relative to "memory" irrespective of whether the memory is system memory, video memory, or any other memory. It should be appreciated that, unless indicated otherwise, techniques described herein may be used with any suitable type of memory, including system memory and video memory. Further, in the examples below, unless indicated otherwise, references to operations performed on "memory space" refers to space in virtual memory. For example, an allocation of memory space is an allocation of virtual memory and an offer of memory space is an offer to discard content of virtual memory. Such virtual memory may be virtual memory associated with system memory and/or with video memory, as appropriate in each example.

As mentioned above, embodiments operating according to techniques described herein may operate in any suitable manner to perform offer and reclaim operations. FIG. 2 illustrates one exemplary technique by which a process may interact with a memory manager to offer and reclaim memory.

The process 200 of FIG. 2 may be carried out by an executing process on a computing device. Prior to the start of process 200, the executing process may carry out any sequence of operations to carry out the functionality of the executing process. Through the course of these operations, when the executing process encounters a need to store content in memory, the process 200 begins. The content to be stored in memory may be any suitable information, including computer code, results of computations, graphics or images for display, or other types of information, as embodiments are not limited to operating with any particular type of content. The process 200 begins in block 202, in which the executing process requests, before the content is generated, that an amount of memory space necessary to store the content be allocated to the executing process. The request and allocation may be carried out in any suitable way, including using known techniques. Once the memory is allocated and made available to the executing process, in block 204, the content to be stored is generated and the allocated memory is used to store the generated content. The content may be generated in any suitable way, which may be dependent on the type of the content.

In one example, memory space may have been allocated in block 202 for use as a temporary staging buffer as part of a graphics rendering process. Such a temporary staging buffer may be used when graphics data is to be conveyed from the executing process that is executing on a central processing unit (CPU) of a computing device to a graphics processing unit (GPU) of the computing device so that rendering operations can be carried out by the GPU. These temporary staging buffers may be allocated virtual memory space associated with video memory, so as to make content accessible in video memory directly accessible by the GPU. Once memory space is allocated in block 202, the executing process can perform various operations in block 204 to generate the graphics data. These operations may include retrieving the graphics data from a source such as a server, disk, or another executing process, or performing one or more computations to yield the graphics data as a result. Once generated, the graphics data may be placed into the memory space that was allocated in the allocated memory space.

At some time after the content is generated, the executing process may, in block 206, temporarily finish using the content. In some cases, the executing process may finish using the content immediately after generating the content, such as when the content is generated in advance of any need for the content. In other cases, though, the executing process may finish using the content after the content has been used by the executing process in some way. To continue the example of the graphics data, once the graphics data has been retrieved by the GPU from the video memory and used to render an interface, or once the interface has been changed or closed by a user, the executing process may be finished using the graphics data. In block 206, the executing process is "temporarily" finished using the content when the content either will or might be used again at some point in the future. To continue the example of the graphics data, if the interface including the graphic may be displayed again at some later time after the interface is closed, such as when the interface is opened again, the graphic may be needed at that later time to display the interface. Thus, while at block 206 the executing process may be finished using the graphic because the GPU has received the data to be rendered and because the interface has now been closed, because the interface could be displayed again and the content may therefore be used again, the executing process may be considered to be temporarily finished using the graphic.

As discussed above, leaving in memory content that is not certain to be used is an inefficient use of memory and may cause memory pressure. However, such caching may offer advantages to an executing process, as when time is saved from retrieving content from memory rather than regenerating the content. In accordance with techniques described herein, a balance may be struck by storing the content in memory but indicating that the content may be discarded if memory pressure occurs.

Accordingly, in response to being temporarily finished using the content, the executing process may carry out an offer operation. In block 208, the executing process notifies the memory manager that the content of the allocated memory space is available for discard. To notify the memory manager, the executing process may provide an identifier for the content and/or the memory space to the memory manager in some way. In some embodiments, one or more API calls may be used to pass an identifier to the memory manager. For example, where the content to be made available for discard is graphics data, an API function of a graphics library may be used to pass to the memory manager an identifier for a graphics data structure, such as a texture data structure, that uses the memory space. As another example, an API call may be used to pass a pointer to or an address for a particular position in virtual memory space or a physical address for a location in fast memory. Any suitable identifier may be passed in any suitable manner.

After the executing process has indicated to the memory manager in block 208 that the memory space includes content that is available for discard, the executing process may continue executing and carry out any suitable operations. In some cases, the executing process may never again need the content for which the offer operation was made and the memory space may be de-allocated either in response to an explicit request from the executing process or through a garbage collection process. In other cases, though, the executing process may again need to use the content that was made available for discard in block 208. To use the graphics example given above, if a graphic is part of an interface and was offered in response to the interface being closed, when the interface is opened again that graphic may once again be needed to render the interface.

The process 200 therefore continues in block 210, in which the executing process subsequently needs to use the contents of the offered memory space, and before using the contents again, performs a reclaim operation to indicate to the memory manager that the executing process intends to use previously-offered contents. A reclaim operation should be carried out for at least two reasons. First, because the content was made available for discard through the offer operation, the executing process should not merely access the memory space again, as the content may have been discarded. If the executing process were to access the memory space and use what is stored there, and the content had been discarded, the executing process may receive null data or junk data instead, which could corrupt the executing process. Performing a reclaim operation permits the executing process to interact with the memory manager and determine whether the content was discarded. Second, because the executing process intends to use the content again, the executing process should ensure that the content is not going to be discarded while the executing process is reusing the content. If a reclaim operation were not performed, the memory manager might consider the memory space as still containing content available for discard, and the content might be discarded while the executing process was reusing the content. This could corrupt the executing process. For at least these reasons, a reclaim operation is carried out when the executing process subsequently needs to use content that has previously been made available for discard.

The reclaim operation of block 210 may be performed by notifying that the executing process intends to reuse the contents of specified memory. To notify the memory manager, as with the offer operation, the executing process may identify the content and/or the memory space to the memory manager in some way. In some embodiments, one or more API calls may be used to pass to the memory manager an identifier. For example, where the content to be reused is graphics data, an API function of a graphics library may be used to pass to the memory manager an identifier for a graphics data structure, such as a texture data structure, that uses the memory space. As another example, an API call may be used to pass a pointer to or an address for a particular position in virtual memory, or in system memory or video memory, to a memory manager. Any suitable identifier may be passed in any suitable manner.

In response to the reclaim operation, the executing process may receive from the memory manager an indication of whether the content of the memory space is still available or has been discarded. In block 212, a response from the memory manager is evaluated to determine whether the response indicates the content is still available. If so, then in block 214 the memory space is accessed and the content of the memory space is used, after which the process 200 ends. If, however, the response from the memory manager indicates that the content was discarded and is not still available, then in block 216 the content that was stored in the specified memory is regenerated and used. Regenerating the content may include any suitable actions, including performing again the actions of block 204 that were carried out to originally generate the content and storing the content in the memory space. After the content is regenerated, stored, and used in block 216, the process 200 ends.

Following the end of the process 200, the executing process may take any suitable actions regarding the memory space. In some cases, the executing process may be finished using the content and may request that the memory space be de-allocated. In other cases, though, the executing process may once again be only temporarily finished using the content and may again perform an offer operation to make the content available for discard.

The example process 200 of FIG. 2 was described above in general terms, without being limited to any particular executing process, type of content, or type of memory. As mentioned above, the process 200 or any other process implementing techniques described herein may be implemented with any suitable process, content, or memory, as embodiments are not limited in this respect. However, further examples of processes, content, and memory that may be used in some embodiments may illustrate ways in which some techniques described herein, and the process 200 of FIG. 2, may be used.

Some computing devices include graphics processing units (GPUs) for performing graphics-related operations and include video memory for storing information processed by the GPU. Such computing devices may be operated more efficiently, and be able to resolve memory pressure more readily, if techniques described herein were used in the management of the video memory.

For example, processes that are executed on a CPU may include various operations to display content in a graphical user interface (GUI) and may engage the GPU to perform those operations. To engage the GPU, the process may request that the GPU perform particular rendering operations like drawing geometric shapes, displaying an object with a certain color, displaying a transparency effects, or rendering text to the interface. Each of these operations may include storing content in virtual memory that is associated with fast video memory. Using techniques described herein, the use of the video memory may be made more efficient. Many computing devices have very limited amounts of video memory, at least as compared to the amount of system memory that may be available. As a result, memory pressure in the video memory may be more common. Further, memory pressure may be more problematic when experienced in video memory. Because graphics operations may involve rendering data to a screen for interaction with a user, any delays in processing of graphics operations may be more likely to be noticed by users. Lastly, because of the time lags associated with allocation and de-allocation operations, and because of the many different temporary storage buffers that are used during rendering operations, processes may store more content in virtual memory long-term, and the video memory associated with that virtual memory can tend to become full of content quickly. Applying "offer" and "reclaim" techniques described herein may have two advantages to graphics processing applications. First, by permitting processes to indicate which content can be discarded, a video memory manager may be better able to address memory pressure that arises in video memory by discarding some content that is stored in the video memory, which can result in faster execution of operations for the graphics processing application. Second, any designers/programmers of processes who attempt to use memory efficiently may be more willing to maintain content in allocated memory space when knowing that the content will be discarded if memory pressure is encountered. As a result, these designers may design process to maintain more content in memory. Where memory pressure is not encountered, the increased caching by these processes may result in an increase in efficiency for the processes, as the processes will not waste time regenerating content that could have been stored in a cache, while not adversely impacting use of the fast video memory as content can be discarded if memory pressure arises.

More specific uses or benefits may be seen in particular graphics scenarios. For example, a graphics library may automatically offer memory storing unused graphics data upon determining that the data is unlikely to be used again. The Direct3D® graphics library available from the Microsoft Corporation of Redmond, Wash., for example, could automatically offer memory space associated with unused render targets. A render target is a collection of data stored in memory that describes a frame to be drawn to a display screen. Render targets may be created for various parts of a 3D display such that the frames are available in advance of when they are needed and do not need to be generated dynamically, which could slow down execution of the process. However, some of the render targets may not be used following a chance in or closing of the 3D display. When such unused graphics data is left in memory space associated with video memory, a graphics library may automatically signal to a memory manager that the unused data is available for discard, so as to possibly increase the efficiency of memory usage.

Graphics libraries may also use these memory management techniques in managing temporary scratch buffers that are created in virtual memory associated with video memory as part of rendering shapes and text for display. Graphics libraries such as the Direct2D™ library available from the Microsoft Corporation may use many of these buffers as part of rendering graphics and may reuse the content and/or the memory space in subsequent render operations. Similarly, the DirectImage™ library available from the Microsoft Corporation may use temporary surfaces in virtual memory associated with video memory to store intermediate results of imaging effects being sequentially applied to an image as a result of image editing. Because the content may be reused, such as when some effects are removed and the previously-intermediate results are to be displayed, processes tend to maintain these temporary buffers and the intermediate results in memory. When multiple applications each use such buffers, memory pressure can result in the fast video memory. Using techniques described herein, these scratch buffers can be offered once they are done being used, which can maintain the allocation of memory space to the process while still permitting the memory manager to discard content stored in the fast video memory to more effectively manage the video memory.

Graphics drivers may also benefit from techniques described herein. Graphics drivers also create temporary buffers and use them as part of providing data to a GPU for processing. When processes begin rendering an interface, the first rendering operations are often large and complex as the interface is established. As a result, graphics drivers often create large buffers (e.g., several megabytes) in virtual memory associated with video memory when a process begins rendering an interface, so as to speed up this rendering process. The graphics drivers often leave these larger buffers in memory for a long while, as the graphics driver cannot be certain of when the application will again render a large amount of data (e.g., in response to a substantial change in interface). Such large allocations may cause memory pressure in the fast video memory, though. Using techniques described herein, the allocations to the drivers can be maintained while the content can be discarded when the memory manager seeks to address memory pressure.

Figure 3:
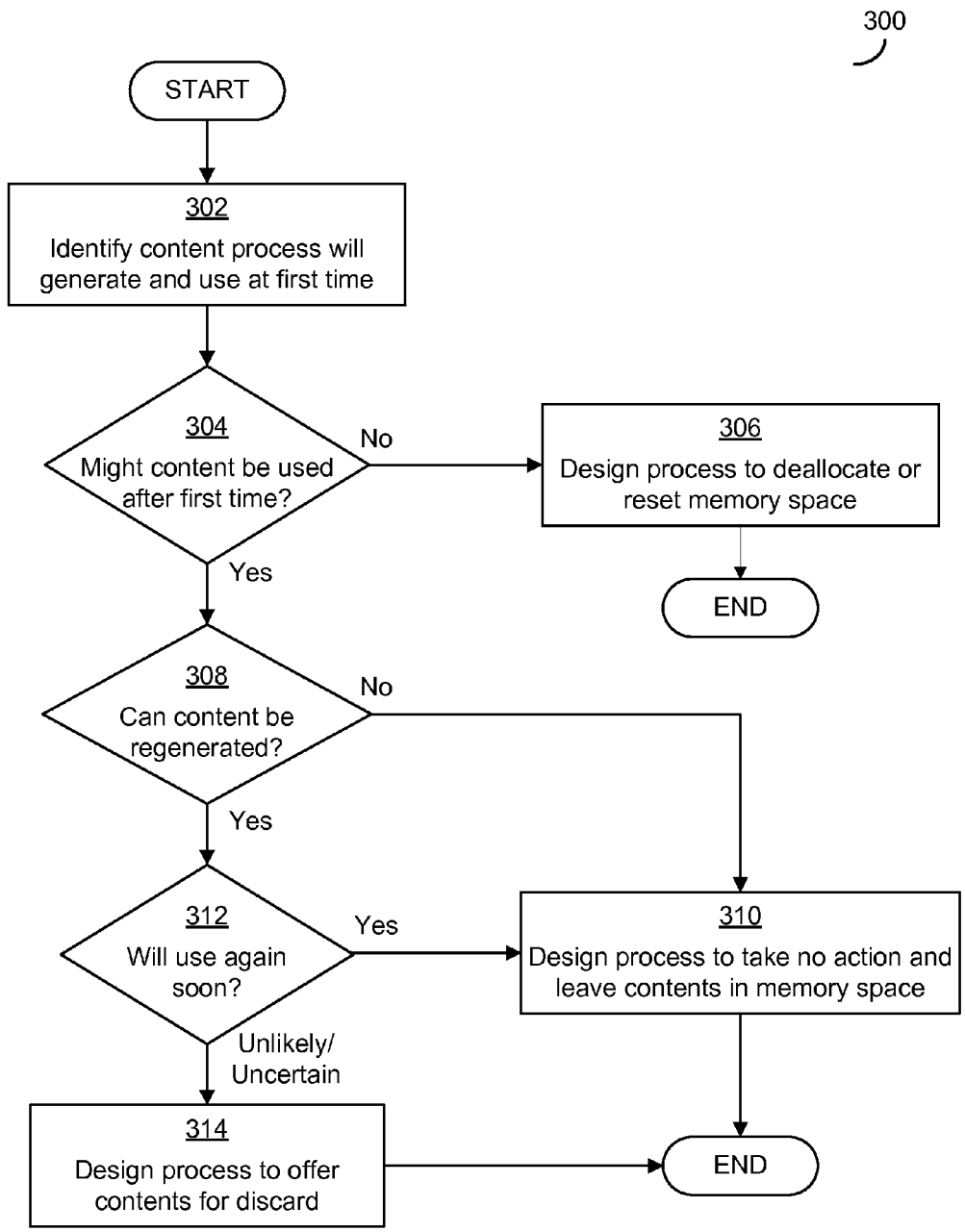
FIG. 3 is a flowchart of an example of a technique for selecting, during designing of a software process, one of a set of available memory management techniques for use.

A process may use offer and reclaim operations as described herein when the process has been designed to do so. To be designed to use these operations, a designer or programmer of the process must insert computer code into the process that invokes these operations and causes the process to interact with a memory manager so as to carry out these operations. The decision to invoke these operations may therefore be made at design time, while the computer code for the process is being written. FIG. 3 illustrates design constraints that may be used by a designer/programmer in deciding whether to invoke an offer operation or whether to invoke alternative memory management operations with respect to particular memory space having particular contents.

The process 300 begins in block 302, in which the designer/programmer identifies content that the process being designed will generate and use at a first time and needs to determine what the process should do with the content after the first time. The designer/processor may choose between several options: doing nothing with the content and leaving the content in memory; requesting that the memory space be de-allocated, in which case the contents are removed and the space is no longer available to the process; requesting that the memory space be reset, in which case the contents are removed and the space is preserved for later use by the process; or offering the memory space, in which case the content might be removed but the space is preserved for later use.

The first design constraint that may be used in determining whether to use an "offer" operation is illustrated in block 304: whether the process might use the content after the first time. If the content will not be used after the first time, there is little reason for the process to request that the memory manager preserve that content in any way. Accordingly, in block 304 the designer/programmer determines whether the process might use the content after the first time. If the content will not be subsequently used, then in block 306 the designer/programmer can design the process not to request that the content be preserved by performing either a de-allocation or reset operation, dependent on whether the process will need the memory space again. Once the process is designed in block 306 to de-allocate or reset the memory space, the process 300 ends.

If, however, the designer/programmer determines in block 304 that the process might use the content after the first time, then a second design constraint is evaluated in block 308: whether the content can be regenerated. If the content is unique, cannot be regenerated, or would be prohibitively difficult to regenerate such as by taking a long time or requiring a large number of resources, then the content should not be discarded or made available for discard. Accordingly, if the designer/programmer determines in block 308 that the content cannot be regenerated, then in block 310 the designer/programmer can design the process to take no action and leave the content in memory for possible later use.

On the other hand, if the content can be regenerated, then leaving the content in memory may be taxing on the fast memory and may result in memory pressure, which might slow down all operations of a computing device. Thus, if it is determined in block 308 that the content can be regenerated, then a third design constraint can be evaluated.

Even if content can be regenerated, it may not be efficient to discard and regenerate the content if the content is certain to be used quickly after the discard operation. A third design constraint, therefore, is whether the content will be used again soon, within a threshold amount of time in the future. The threshold may be any suitable threshold amount of time, as embodiments are not limited in this respect. If the designer/programmer determines in block 312 that the content is certain to be used again within the threshold time, then in block 310 the designer/programmer can design the process to take no action and leave the content in memory for the later use. Once the process is designed in block 310, as a result of the determination in block 308 or in block 312, the process 300 ends.

If, however, in block 312 the designer/programmer is not certain of whether the process will use the content again with the threshold period of time, such as when use of the content depends on actions of a user or an entity other than the process, then in block 314 the designer/programmer may design the process to offer contents for discard to the memory manager. Once the process is designed in block 310, the process 300 ends.

Thus, using the design constraints of the example of FIG. 3, an offer operation may be used when the content can be regenerated and the content might be used at some future time, though it is uncertain when the content will be used again or any such use would be beyond a threshold amount of time in the future. It should be appreciated, however, that embodiments are not limited to employing these design constraints and that a designer/programmer may decide to invoke an offer or reclaim operation based on any suitable factors.

It should also be appreciated that, while the example of FIG. 3 relates to determining at design time whether to use an offer operation or a de-allocation operation, embodiments are not so limited. In some embodiments, a process can be designed to invoke an offer at runtime in response to satisfaction of one or more conditions or involve selecting between an offer and a reset or de-allocate based on satisfaction of one or more conditions. Such conditions may be results of determinations by the process during runtime. For example, the process may review content, a state of the process, interactions with a user, or any other suitable factors and determine whether content might be used again in the future, and when. As in the example of FIG. 3, if the content will not be used, then the process may decide to de-allocate memory storing the content, while if the content might be used, then the process may offer the memory space to the memory manager.

The examples above focused on operations of an executing process in interacting with a memory manager to perform offer and reclaim operations during execution of the process. A memory manager may react in any suitable manner to receipt of offer and reclaim operations. FIGS. 4-9 illustrate examples of processes that may be carried out by a memory manager to carry out actions requested by offer and reclaim operations and to interact with executing processes.

Figure 4:
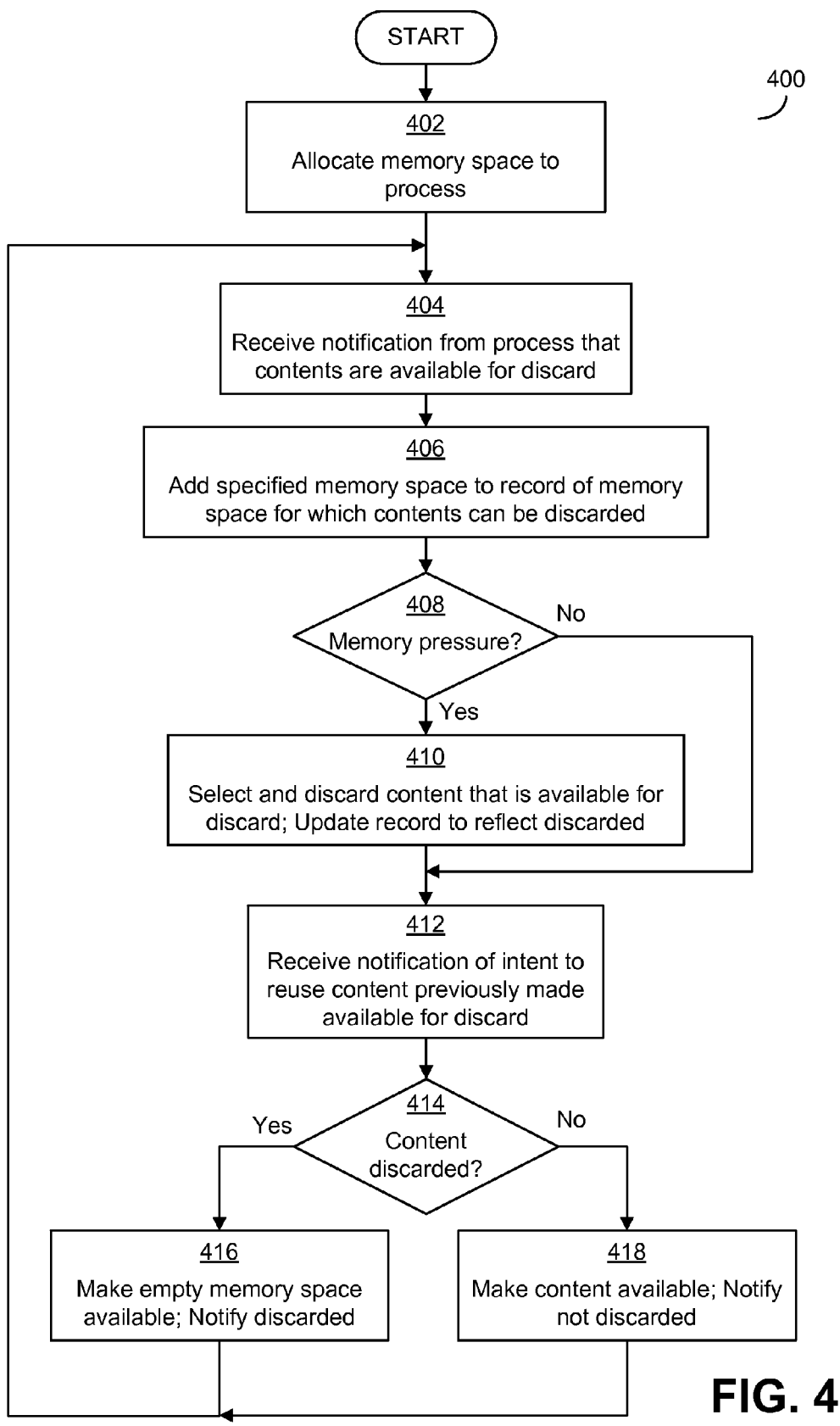
FIG. 4 is a flowchart of an example of a technique for operating a memory manager of a computing device to manage memory reserved by an executing process.

The process 400 of FIG. 4 may be carried out by a memory manager throughout interactions with an executing process. The executing process can carry out any suitable process for interacting with the memory manager, including the process 200 of FIG. 2.

Prior to the start of the process 400, the memory manager may be operating to manage memory and interact with other executing processes to allocate and use memory of a computing device. The process 400 begins in block 402, in which the memory manager allocates memory space to an executing process. The memory space may be allocated by the memory manager in response to a request from the executing process that a specified amount of memory be allocated to the executing process. If the executing process is carrying out the process 200 of FIG. 2, the request for allocation received by the memory manager in block 402 may be a request carried out according to block 202 of FIG. 2. Known allocation techniques may be used in block 402. For example, to allocate memory, the memory manager may determine whether the requested amount of memory space is available for allocation. The memory manager may review records regarding memory allocation, including amounts of remaining memory, and, if sufficient memory space is available, grant the allocation and make available the requested amount of memory space.

The memory manager can subsequently interact with the executing process as the executing process stores content in the allocated memory space, retrieves the content from the memory space, or performs any other suitable operations regarding the memory space. At some time following the allocation, though, the memory manager receives from the executing process a notification that the content of the memory allocated in block 404 is available for discard. The notification from the executing process can identify the content and/or the memory space in some way, such as using any of the exemplary ways of identifying content or memory space discussed above in connection with FIG. 2. For example, the notification may include an identifier for the content or may include an address of the memory space.

Upon receiving the notification that content can be discarded, the memory manager may not immediately discard the content, unless the computing device is already experiencing memory pressure and the memory manager selects that content to discard. Rather, the memory manager may note that the content can be discarded if the memory manager detects that the computing device is experiencing memory pressure, as discussed below. In block 406, therefore, in response to the notification received in block 404, the memory manager may update records maintained by the memory manager regarding the memory space. In particular, the memory manager may update a record of memory space for which the content has been made available for discard. Maintaining and updating such records allows the memory manager to track what content can be discarded to resolve memory pressure. The record may be maintained in any suitable manner and contain any suitable information, as embodiments are not limited in this respect. In some cases, the record may include a listing of addresses for memory space for which the content can be discarded. Other information may be stored, including a time that the content was indicated to be available for discard or other suitable information that may be used in selecting from the record content that is to be discarded to address memory pressure. The record may be stored in any suitable manner, including as a record separate from any of the memory space, such as a listing of memory space for which the content has been made available for discard, and as settings associated with each of the memory spaces, such as being stored with other properties for memory space.

A memory manager of a computing device may be responsible for managing a state of a fast memory to ensure that the fast memory is efficiently used and allocated and that the state of the fast memory does not interfere with the execution of processes on the computing devices. As part of this, a memory manager may be responsible for detecting instances of memory pressure. Exemplary ways of detecting memory pressure are discussed in detail below in connection with FIG. 5. In some embodiments, memory pressure can be experienced by a computing device where a fast memory of a computing device is in a state that causes additional time to be taken for carrying out routine operations of the computing device. For example, when the fast memory is in a state that requires paging content into and out of the fast memory, because more content is to be stored than can fit in the fast memory, memory pressure may be experienced.

The memory manager may therefore periodically examine a state of the fast memory to determine whether the computing device is experiencing memory pressure. In block 408, the memory manager may take any suitable actions to determine whether memory pressure exists in the computing device at that time. Any suitable detections or determinations may be made to determine whether memory pressure is being experienced, examples of which are described below in connection with FIG. 5. As one example, in some embodiments a determination may be made as to whether fast memory, including either or both of system memory and video memory, contains more than a threshold amount of content or is full, such that paging is necessary to place content into fast memory.

It should be appreciated that while, for ease of illustration, the determination of block 408 is shown following receipt of an offer operation making content available for discard, a determination of whether a computing device is experiencing memory pressure may be made by the memory manager at any time. A determination of whether memory pressure exists is not limited to being made following an offer operation like the one of block 404.

If the memory manager determines in block 408 that the computing device is experiencing memory pressure, then in block 410 the memory manager may select and discard content that is available for discard. Examples of ways in which a memory manager may select content for discard are discussed below in connection with FIG. 6. In some embodiments, the memory manager may select content for discard based on a time at which the content was indicated to be available for discard, such that the oldest content is discarded first, though any suitable selection process may be carried out. In block 410, when content is discarded, any suitable active or passive step may be taken to discard the content. In some cases, the content may be actively discarded, such as by actively deleting content or actively overwriting content in response to selecting the content for discard. In other cases, the content may be passively discarded, such as by ceasing to preserve the content, such that content selected for discard is not written to a page file or other storage when contents are being moved out of fast memory to make space for other content to be stored in the fast memory.

When content is discarded, the memory manager may also update records regarding the memory to reflect the discard, such that the memory manager may be able to determine later whether content stored in specified memory space was discarded. The records may be maintained in any suitable manner. For example, the records may be maintained as a part of or separate from records regarding offered memory space. In some embodiments where the records are maintained together, information in a record of offered memory space regarding a specified memory space may be updated to reflect that content in that memory space has been discarded.

Once the memory pressure has been addressed in block 410, or if no memory pressure was detected in block 408, the memory manager continues to execute and interact with other executing processes and manage memory. The process 400 continues in block 412 when the memory manager receives from the executing process, to which the memory space was allocated in block 402 and from which the notification was received in block 406, a reclaim operation notifying the memory manager of an intent to reuse the content that was made available for discard in block 406. In response to the notification of block 412, in block 414 the memory manager may determine whether the content that is to be reclaimed by the executing process was discarded. Determining whether the content was discarded may be carried out in any suitable manner, including by reviewing the records regarding the memory that indicate whether content was discarded.

If the memory manager determines in block 414 that the content was discarded, then in block 416 the memory manager makes available in fast memory empty memory space in an amount corresponding to the amount of the original allocation. The memory manager makes this empty memory space available so that the executing process can store the content in memory once the content is regenerated. Once the empty memory space is made available in fast memory, the memory manager responds to the executing process indicating that the content was discarded.

If, however, the memory manager determines in block 414 that the content was not discarded, then the memory manager may make the content available in fast memory. Making the content available in fast memory may involve taking any suitable action, including retrieving the content from a page file and placing the content in fast memory if the content had been placed in the page file. Once the content is available, the memory manager may respond to the executing process with an indication that the content was not discarded and is available.

After the memory manager responds to the executing process in either of block 416 or 418, the process 400 continues back to block 404. As discussed above, the memory manager may interact with one or more executing processes during accesses to memory spaces by the executing processes. An executing process may then in block 404 notify the memory manager that specified content is available for discard, which may in some cases be a second, third, etc. time the executing process has indicated that content in the memory space is available for discard.

Eventually, at some later time not illustrated in FIG. 4, the memory space allocated in block 404 may be de-allocated as a result of either a specific instruction from the executing process or as part of a garbage collection process.

As discussed above in connection with block 408 of FIG. 4, any suitable process may be carried out for detecting whether a computing device is experiencing memory pressure. Additionally, memory pressure may be associated with any suitable conditions on the computing device, as embodiments are not limited to operating with any particular type of memory pressure. Rather, embodiments may operate to discard content in response to any suitable condition on a computing device.

Figure 5:
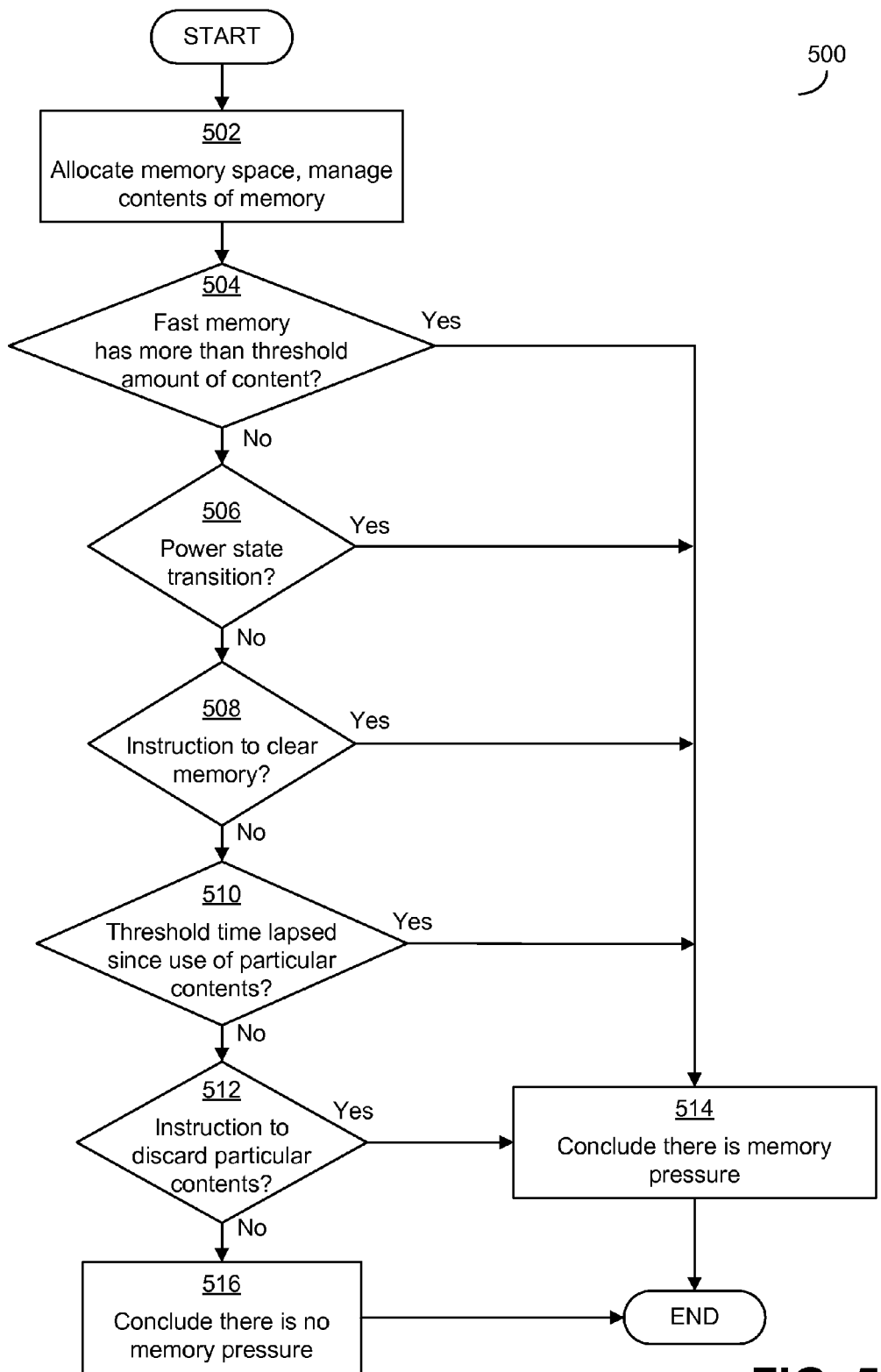
FIG. 5 is a flowchart of an example of a technique for determining whether a computing device is experiencing memory pressure.

The process 500 of FIG. 5 is one exemplary technique for detecting memory pressure on a computing device. As illustrated in FIG. 5, five different conditions may be analyzed by a memory manager, each of which may lead to a determination that a computing device is undergoing memory pressure.

The process 500 begins in block 502, in which a memory manager of a computing device performs various operations to interact with executing processes to allocate memory and manage contents of memory. The memory manager may periodically or occasionally examine a state of memory of the computing device to determine whether the computing device is undergoing memory pressure. When the memory manager is to examine the state of the memory, the memory manager may perform the operations of blocks 504-518.

In block 504, the memory manager may determine whether the fast memory contains more than a threshold amount of content. For example, the memory manager may determine whether the fast memory is full of content, which may occur when more virtual memory space has been allocated than the fast memory is capable of containing. For example, where fast memory has a capacity of two gigabytes, and three gigabytes of virtual memory has been allocated, then the fast memory may be full of contents. More virtual memory can be allocated than the fast memory can contain because paging techniques can be used to move contents into and out of the fast memory, such that contents to be accessed at some time are present in the fast memory and contents that will not be accessed are not present in the fast memory at that time. However, paging techniques require extra operations and time to write first content of the fast memory to a page file, retrieve second content from the page file, and replace the first content with the second content in the fast memory. These extra operations and time may slow down a computing device and processes executing on a computing device. Therefore, when the fast memory is detected to contain more than the threshold amount of content, the memory manager may detect memory pressure and conclude in block 514 that the computing device is experiencing memory pressure. As discussed above, when memory pressure is detected, content may be discarded as part of addressing the memory pressure. For example, content stored in the fast memory may be discarded. Where memory pressure results from the fast memory containing more than the threshold amount of content, discarding some content may relieve the memory manager of the need to write that content to a page file before writing other content to the fast memory, which may speed operations of the computing device.

If, however, the memory manager determines in block 504 that the fast memory does not contain more than the threshold amount of content, then another condition may be checked in block 506: whether the computing device is to undergo a power state transition. In some power state transitions, such as "sleep" or "hibernate" transitions, contents of fast memory may be written to slow memory (e.g., to a "hiberfile" stored in a storage drive) in a manner similar to paging so that the contents can be preserved throughout the power state transition. When contents are to be written to slow memory, the time necessary to write the contents may depend in part on the amount of contents to be written. When there is more content to be written, the writing may take more time. Accordingly, when the memory manager determines that the computing device is to undergo a power state transition, the memory manager may conclude in block 514 that the computing device is experiencing memory pressure. As above, memory pressure may be addressed by discarding some content, such as by discarding content stored in fast memory. In the case of a power state transition, discarding some contents may relieve the computing device of writing those contents to a slow memory during the power state transition and therefore expedite the power state transition.

If the memory manager determines in block 506 that the computing device is not to undergo a power state transition, then the memory manager may determine next in block 508 whether an instruction was received to clear memory. Clearing of memory may be performed for a variety of reasons. For example, when a fast memory is to be re-synchronized to a system clock, contents of the fast memory may be cleared first to ensure that data is correctly read from and written to the fast memory following the change of the clock. Clearing of fast memory may result in contents of the fast memory being written to slow memory to preserve the contents through the clearing of memory. As in the examples of blocks 504 and 506 above, where there is more contents stored in the fast memory, writing the contents to slow memory may take more time and slow down operations of the computing device. The memory manager may therefore conclude in block 514 that the computing device is experiencing memory pressure when the memory manager detects that an instruction to clear fast memory has been received and, in response to the determination, discard content stored in the fast memory.

The examples of blocks 504-508 included detecting whether general conditions of the computing device were causing memory pressure on the computing device. Specific content or specific instructions regarding content may also be detected by the memory manager as causing memory pressure on the computing device. For example, in block 510, the memory manager may determine whether a threshold amount of time has passed since content, which was offered as available for discard, has been used by an executing process. If the threshold time has passed, then the memory manager may conclude that the content is likely not to be used and may be merely clogging the fast memory. The memory manager may therefore conclude in block 514 that the computing device is undergoing memory pressure and may, in response, discard contents to address the memory pressure. The contents that are discarded in response to the determination may be those contents that have not been used for the threshold period of time and may be clogging the fast memory.

If, however, no contents have been untouched for the threshold amount of time, then in block 512 the memory manager may determine whether an instruction has been received to discard particular contents of specified memory space. Such an instruction may be received for any suitable reason, including for testing purposes. In some embodiments operating according to techniques described herein, memory that is allocated to a process and storing contents for a process may discard the contents without notification to the process without first determining whether the content was discarded. If a process attempts to use the contents, corruption may occur. Software testing can be carried out during design of a process to identify any instances of possible corruption of the process and eliminate that corruption. As part of testing a process, a testing facility may instruct the memory manager to discard particular contents that are stored in memory space allocated to a process and that the process has indicated is available for discard. The testing facility may then be able to determine how the process responds when the content has been discarded and whether any corruption results. Instructions to discard particular contents may be received for any suitable reason, though, and are not limited to testing purposes. If the memory manager determines in block 512 that an instruction to discard particular memory has been received, then the memory manager may conclude in block 516 that the computing device is experiencing memory pressure and, in response to the determination, discard content.

If the memory manager did not conclude that any of the conditions of blocks 504-512 are present in the computing device, then the memory manager may conclude in block 514 that the computing device is not experiencing memory pressure. Once the memory manager reaches a conclusion in one of block 514 and 516, the process 500 ends.

For ease of illustration, the process 500 is shown in FIG. 5 as successively reviewing the conditions to be evaluated. It should be appreciated, though, that embodiments that evaluate these conditions or any other conditions are not limited to reviewing conditions in any particular order, including the order shown in FIG. 5. Further, it should be appreciated that embodiments are not limited to successively reviewing any conditions. In some embodiments, rather than performing a process to review all possible conditions periodically or occasionally, the memory manager may be configured to review or detect particular conditions in response to particular events occurring on the computing device. For example, the memory manager and the computing device may be configured such that, when a power state transition begins, the memory manager responds to the event by addressing memory pressure. Similarly, the memory manager may be configured to respond to instructions to clear memory or discard particular contents by addressing memory pressure. In these embodiments, at least some conditions will be evaluated upon occurrence of events, rather than being evaluated periodically or occasionally.

Regardless of how or under what conditions the memory manager detects the computing device to be experiencing memory pressure, the memory manager may respond to memory pressure by discarding content that has been made available for discard. In some cases, multiple regions of memory storing multiple contents may have been made available for discard by the processes to which the memory regions are allocated. To address memory pressure, a memory manager may discard all of the offered content or may instead select one or more memory regions and discard the content of the selected memory regions. Where memory is selected for discard, any suitable amount of memory may be discarded. In some embodiments, for example, fixed-size units of memory may be discarded together. The fixed-size units may be any suitable units, including a block size of a file system of the computing device, such as four kilobytes. In other embodiments, individual units of content, regardless of size, may be selected for discard until the memory manager determines that the memory pressure has been addressed or resolved.

In embodiments where a memory manager selects content for discard, the memory manager may carry out any suitable process for selecting content for discard. In some embodiments, as in the example of FIG. 6 below, a memory manager may select the content based on properties of content that has been made available for discard. Additionally or alternatively, a memory manager may select content when specific content caused the detection of memory pressure, such as the examples of blocks 510 and 512 of FIG. 5.

Figure 6:
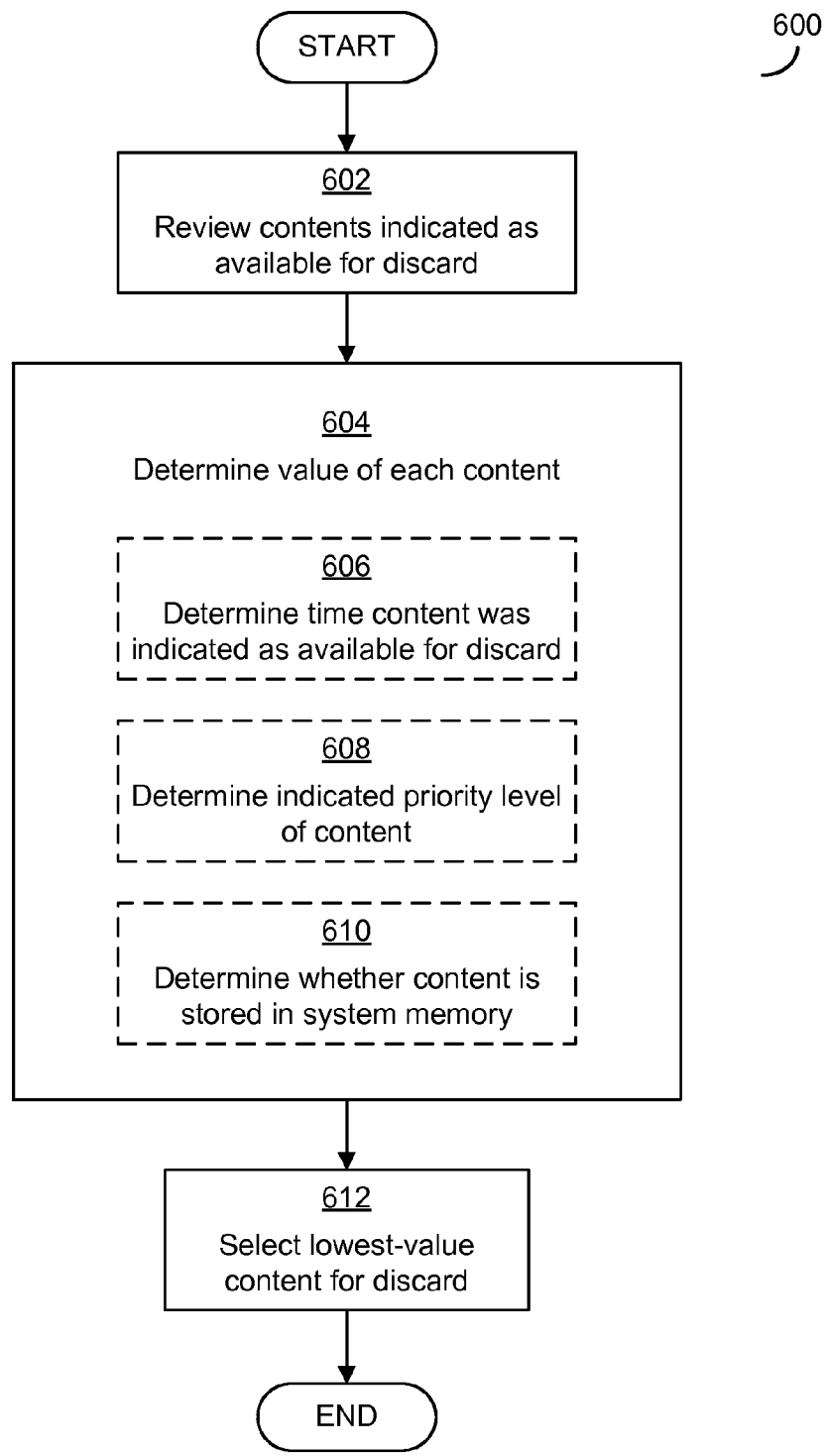
FIG. 6 is a flowchart of an example of a technique for determining, from memory for which the contents are available for discard, particular memory for which the content will be discarded.

FIG. 6 illustrates one exemplary technique for selecting, from content available for discard, content that is to be discarded. In the example of FIG. 6, one of the parameters that may be weighed is a priority level for the content, as indicated by an executing process that generated the content. When the executing process notifies the memory manager that the content is available for discard, such as through an offer operation, the executing process may additionally notify the memory manager of a priority level of the content. A priority level may indicate a relative worth of the content to the executing process. The relative worth may be based on an expectation of the content's future use and/or on an expected difficulty of regenerating the content. More particularly, in some embodiments a priority level may be selected by an executing process based on a likelihood that the content will be used again, a time the content is expected to be used again, and/or a time necessary for the executing process to regenerate the content. Any suitable priority levels may be used, as embodiments are not limited in this respect. In some embodiments, priority levels may be selected from a scale of low, medium, and high. Where priority levels are used, the priority levels may be passed from the executing process to the memory manager in any suitable manner. For example, when the executing process notifies the memory manager that content is available for discard, in addition to other potentially-passed parameters such as identifiers for content or addresses for memory, the executing process may also pass a priority level for the content.

As set forth in the example of FIG. 6 below, in embodiments where priority levels are used, the priority levels may be used in determining a value of each content made available for discard. The determined values may be used in selecting content to be discarded.

Prior to the start of the process 600, the memory manager may have reviewed the state of memory in any suitable manner and determined, from that review, that the computing device is experiencing memory pressure. As discussed above, when memory pressure is detected, the memory manager may select from the content made available for discard specific memory to be discarded. The process 600 begins in block 602 with a review of the contents that have been indicated as available for discard. The review may be carried out in any suitable manner, such as by reviewing the content and/or reviewing properties regarding the content. In some embodiments, all of the content made available for discard may be reviewed in block 602, while in other embodiments only a portion of the content may available for discard may be reviewed. Where only a portion is reviewed, the portion may be selected in any suitable manner. In some embodiments that review only a portion of the contents made available for discard, the portion may be those contents that are presently in fast memory of the computing device and that may therefore aid in addressing memory pressure when contents are discarded. This may be done because, in some cases, content that had been previously made available for discard might have been placed into a page file as a result of paging techniques. Because discarding content that is already present in a page file may not have as great an impact in addressing memory pressure as discarding content that is present in fast memory, in these embodiments the contents in the page file may not be reviewed. Though, in other embodiments, content stored in a page file could be reviewed and selected for discard where other content in fast memory is available for discard.

In block 604, once contents are reviewed in block 602, the memory manager may determine a value of each content based on the properties of the contents. The value may be determined in any suitable manner, as embodiments are not limited in this respect. In some cases, a weighting function may be performed on any suitable properties of the content, including the properties described above, to yield a value for the content. As part of determining the value, properties of each of the content may be determined so that these properties can be considered. For example, in block 606, a time that the content was indicated as available for discard may be determined. The time may be used to determine an age of the content, as the age may indicate how likely the content is to be used again. If content has been left unused in memory for a long while after being made available for discard, the memory manager can conclude that the content is unlikely to be used and thus may have a low value. A priority level can also be determined by the memory manager in block 608, such as by reviewing a priority level communicated from an executing process. Reviewing the priority value in this way allows some input from the executing process to be considered in determining the value of the content. Lastly, whether the content is stored in system memory or in some other memory (e.g., video memory) may be considered. In some embodiments, content that is stored in system memory may be more quickly deleted than content in other memories, as the system memory may be used by more processes and may be in higher demand. For example, in embodiments where a video memory manager is determining which graphics content to discard from among available graphics content, the video memory manager may consider whether graphics data is stored in system memory. In some embodiments, when memory space is allocated for storing graphics data, the memory space may be allocated in either a "memory-space segment," in which case the content may be stored in video memory, or in an "aperture-space segment," in which case the content may be stored in system memory. In some such embodiments, the video memory manager may discard any contents stored in aperture-space segments, and therefore in system memory, upon expiration of a time period or otherwise before other graphics data stored in video memory.

Based on determinations of blocks 606-610, as well as any other suitable determinations regarding the contents made available for discard, in block 604 a value is determined for each of the contents made available for discard. Subsequently, in block 612, the lowest-value content is discarded. As mentioned above, in some cases multiple units of content may be discarded together, so as to total to a particular size (e.g., a block size of a file system) or through repeating a discard until the memory manager determines that the memory pressure has been addressed or resolved. Accordingly, discarding of the lowest-value content in block 612 may include discarding of a single unit of content or may include successively discarding lowest-value content until some condition is met.

Once content has been discarded in block 612, the process 600 ends.

Figure 7:
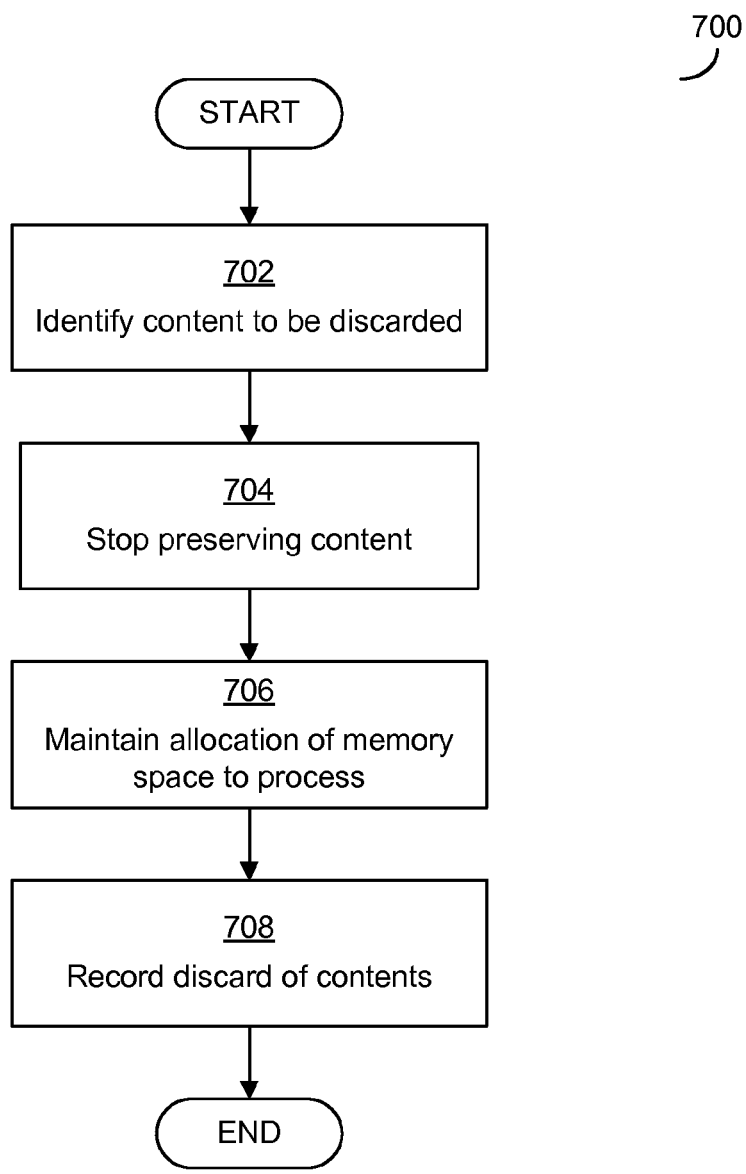
FIG. 7 is a flowchart of an example of a technique for discarding of content of selected memory.

As mentioned above, discarding of content may be carried out in any suitable manner, including through an active discard or through a passive discard. In an active discard, the content may be actively deleted or actively overwritten directly in response to the determination that the content should be discarded. A passive discard may not involve such a direct response to a determination to discard content. FIG. 7 illustrates one technique which may be used for discarding content that has been selected for discard.

Prior to the start of the process 700, a memory manager may have detected that a computing device is experiencing memory pressure and may have reviewed contents available for discard. The process 700 begins in block 702, in which content to be discarded is identified. Once that content is identified, then in block 704 the memory manager stops preserving those contents. By ceasing to preserve the contents, the memory manager may not be directly deleting or overwriting the contents, but the memory manager may instead be allowing such deletions or overwrites to occur. For example, when a memory manager normally engages in paging techniques to bring contents from a page file to fast memory, the memory manager typically copies some content that was in the fast memory to the page file. Where the memory manager has stopped preserving content in fast memory, however, when the memory manager brings content from the page file to the fast memory, the memory manager may not first copy the contents to be discarded into the page file. Thus, the memory manager allows the selected content to be overwritten in the fast memory during the paging process.

In block 706, once the memory manager has stopped preserving the content identified in block 702, the memory manager may also maintain an allocation of memory space to an executing process associated with the discarded content. The memory manager may maintain the allocation in block 706 by not adjusting an allocation or refraining from adjusting an allocation. As mentioned above, an allocation of memory space to the executing process may not be adjusted because the executing process did not request that the memory space be de-allocated, but has only indicated that the contents of the memory may be discarded. When the contents are discarded, the executing process may respond by regenerating the contents when the contents are subsequently needed by the executing process. When contents are regenerated, the executing process will need memory space in which to store the contents. The memory manager may therefore continue to make the memory space available to the executing process, even following discard of the contents, as the memory space may be subsequently used by the executing process to store regenerated content.

In block 708, the memory manager may respond to the discard by recording in records of the memory manager that the content was discarded. As discussed above in connection with FIG. 4, any suitable records may be updated in any suitable manner to reflect the discard, as embodiments are not limited in this respect.

Once the content is discarded in block 708, the process 700 ends.

The exemplary techniques described above may be used by an executing process to indicate to a memory manager that content is available for discard (an "offer" operation) and to subsequently indicate to a memory manager that the executing process intends to reuse the content and that the content, if not yet discarded, is no longer available for discard (a "reclaim" operation). As mentioned above, a reclaim operation should be performed after an offer operation and before any subsequent access to the memory space to ensure that the contents are still available and have not been discarded. A use of the contents when the contents have been discarded has the potential to cause corruption of an executing process, as the executing process may receive null or junk data in response to the use of the memory space in which the contents were stored.

Figure 8:
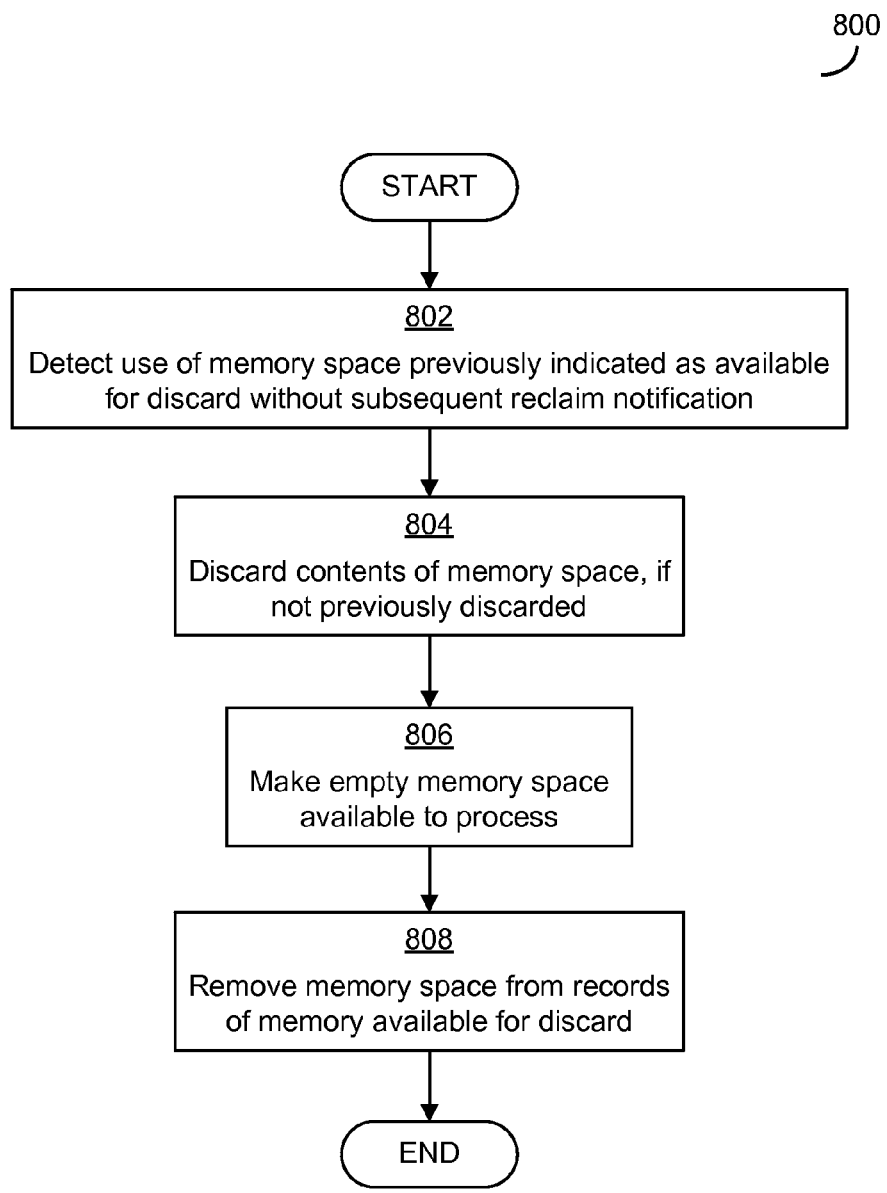
FIG. 8 is a flowchart of an example of a technique by which a memory manager may respond to use by an executing process of memory the executing process has indicated includes content available for discard without subsequently requesting that the content be reclaimed.

In some embodiments, a memory manager may be configured to attempt to prevent such corruption by detecting when an executing process is making an access to memory space that was made available for discard without first performing a reclaim operation. Process 800 of FIG. 8 illustrates one such technique that may be used by memory managers.

The process 800 begins in block 802, in which the memory manager detects that an executing process is attempting to use memory space that was previously indicated as available for discard and that no reclaim notification has been received from the executing process. The detection may be made in any suitable manner. For example, the memory manager may receive from the executing process an API call to use the memory. In response to the detection of block 802, the memory manager may carry out various operations prior to the executing process being permitted to access the memory. In block 804, the memory manager discards the contents of the memory that is to be accessed, if the contents have not already been discarded. In block 806, the memory manager makes empty memory space available in fast memory for use by the executing process in place of the content that was discarded, as the memory manager would have done had the content been discarded and a reclaim operation had been performed by the executing process. The memory manager may then in block 808 update records of the memory manager regarding memory space that contains content available for discard to indicate that the memory space that is to be accessed by the executing process is no longer available for discard. Once the empty memory space is available and the records have been updated, the process 800 ends.

Figure 9:
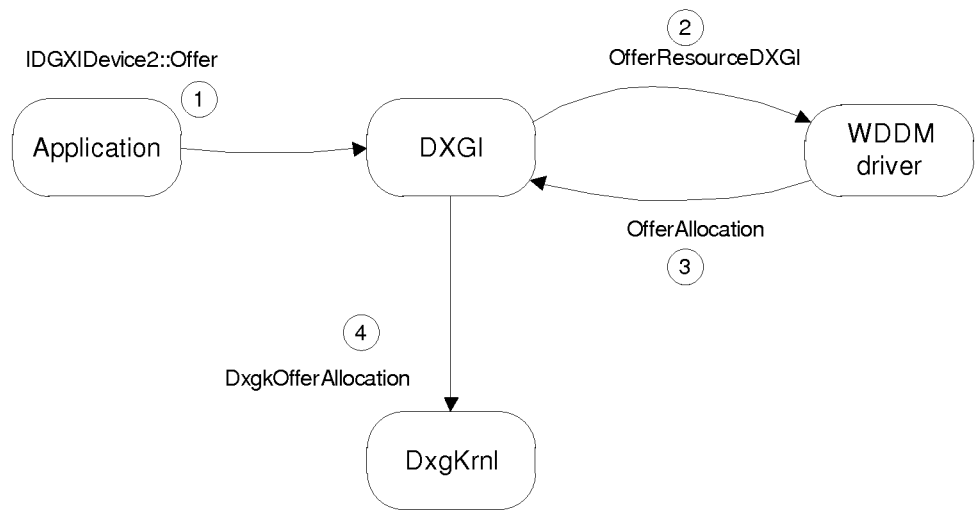
FIG. 9 is a diagram of one exemplary set of software elements with which embodiments may operate and an order in which the elements may process an offer operation in accordance with techniques described herein.

Techniques described herein can be used in any exemplary environment, with any suitable executing processes, content, and memory managers. In some embodiments, the techniques may be used as part of a system for rendering graphics to a display screen. FIG. 9 illustrates elements of one such system for rendering graphics to a display screen, as well as exemplary API calls that may be used to exchange messages between the elements and an exemplary communication flow for processing an offer operation carried out by an executing process.

In the example of FIG. 9, an executing process that interacts with a memory manager to request that memory be allocated and to interact with that memory may be a software application that renders graphics to a display screen as part of a user interface. The memory manager with which the software application interacts may be a video memory manager that manages a video memory of a computing device. The video memory manager may be implemented in any suitable way, including as the DirectX® graphics kernel (DxgKrnl) of the DirectX® graphics system available from the Microsoft Corporation. In the DirectX® system, the software application may in some cases not communicate directly with the DxgKrnl, but may instead communicate via an interface that takes responsibility for carrying out operations on behalf of the software application. This interface is the DirectX® Graphics Interface (DXGI). As illustrated in FIG. 9, to perform an offer operation, the software application may make an API function call to the DXGI requesting that a particular graphics resource be offered as content available for discard. The API function call made by the software application may be the IDXGIDevice2::Offer function call. As part of this function, the software application may provide to the DXGI an identifier for a graphics resource, such as a data structure storing graphics data, that is managed by the DirectX® system.

When the DXGI receives the function call from the software application, the DXGI may in turn issue a function call to identify memory space that is associated with the graphics resource identified by the software application. As shown in FIG. 9, to determine the associated memory space, the DXGI may communicate with a graphics driver implemented according to the Windows Display Driver Model (WDDM). The API call made by the DXGI may be the OfferResourceDXGI function, which may also provide an identifier for the graphics resource.

In response to the API function call made by the DXGI, the WDDM driver may in turn determine the memory space associated with the indicated graphics resource and respond to the DXGI. To respond to the DXGI, the WDDM driver may again perform an API function call, in this case the OfferAllocation call, which may pass to the DXGI an identifier for the memory space associated with the graphics resource. The memory space may be identified in any suitable manner, including through a memory address.

As illustrated in FIG. 9, when the DXGI receives the identifier for the memory space from the WDDM driver, the DXGI may in turn communicate to the DxgKrnl (i.e., the video memory manager) to request that the memory space associated with the graphics resource be placed in an "offered" state and that the DxgKrnl manage the memory space as offered memory.

While not illustrated in the example of FIG. 9, a similar communications flow, albeit with different API function calls, may be carried out in the graphics system for performing a reclaim operation.

Techniques operating according to the principles described herein may be implemented in any suitable manner. Included in the discussion above are a series of flow charts showing the steps and acts of various processes that manage memory so as to make content that has been made available for discard when memory pressure is experienced by a computing device. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of software. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application or software system. For example, in some embodiments functional facilities implementing these techniques may be incorporated into software applications as part of a graphics functionality of the software application, and/or into a graphics rendering system such as the DirectX® system available from the Microsoft Corporation of Redmond, Wash. In other implementations, the functional facilities may be adapted to interact with other functional facilities in such a way as form an operating system, including the Windows® operating system, available from the Microsoft® Corporation of Redmond, Wash. In other words, in some implementations, the functional facilities may be implemented alternatively as a portion of or outside of an operating system.

Some exemplary functional facilities have been described herein for carrying out one or more tasks, including a memory manager and functionality of processes that interact with memory. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1006 of FIG. 10 described below (i.e., as a portion of a computing device 1000) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Figure 10:
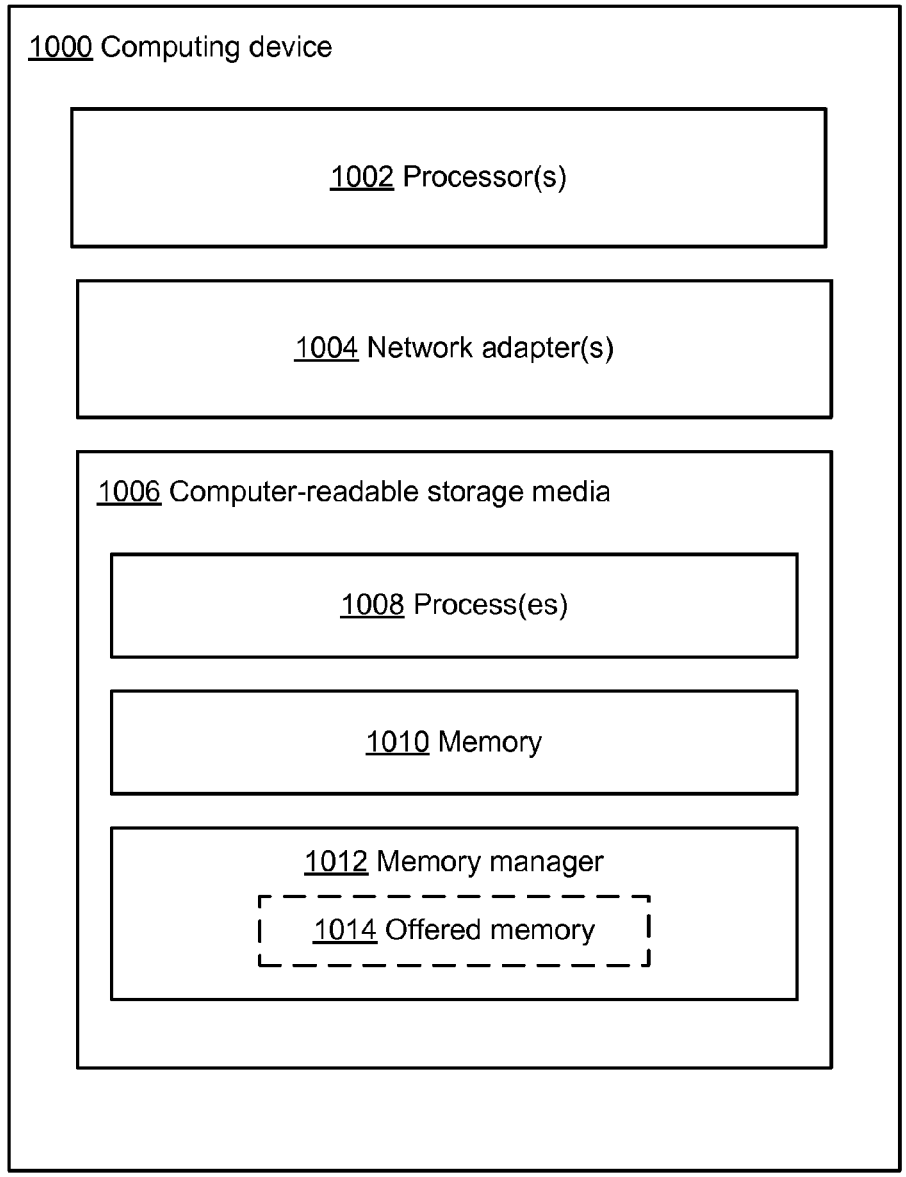
FIG. 10 is a block diagram of an example of a computing device with which some embodiments may operate.

In some, but not all, implementations in which the techniques may be embodied as computer-executable instructions, these instructions may be executed on one or more suitable computing device(s) operating in any suitable computer system, including the exemplary computer systems of FIGS. 1 and 10, or one or more computing devices (or one or more processors of one or more computing devices) may be programmed to execute the computer-executable instructions. A computing device or processor may be programmed to execute instructions when the instructions are stored in a manner accessible to the computing device/processor, such as in a local memory (e.g., an on-chip cache or instruction register, a computer-readable storage medium accessible via a bus, a computer-readable storage medium accessible via one or more networks and accessible by the device/processor, etc.). Functional facilities that comprise these computer-executable instructions may be integrated with and direct the operation of computing devices such as a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

FIG. 10 illustrates one exemplary implementation of a computing device in the form of a computing device 1000 that may be used in a system implementing the techniques described herein, although others are possible. It should be appreciated that FIG. 10 is intended neither to be a depiction of necessary components for a computing device to operate in accordance with the principles described herein, nor a comprehensive depiction.

Computing device 1000 may comprise at least one processor 1002, a network adapter 1004, and computer-readable storage media 1006. Computing device 1000 may be, for example, a desktop or laptop personal computer, a personal digital assistant (PDA), a smart mobile phone, a server, a wireless access point or other networking element, or any other suitable computing device. Processors 1002 may include any suitable processors, including central processing units (CPUs) and/or graphics processing units (GPUs). Network adapter 1004 may be any suitable hardware and/or software to enable the computing device 1000 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 1006 may be adapted to store data to be processed and/or instructions to be executed by processor 1002. Processor 1002 enables processing of data and execution of instructions. The data and instructions may be stored on the computer-readable storage media 1006 and may, for example, enable communication between components of the computing device 1000.

The data and instructions stored on computer-readable storage media 1006 may comprise computer-executable instructions implementing techniques which operate according to the principles described herein. In the example of FIG. 10, computer-readable storage media 1006 stores computer-executable instructions implementing various facilities and storing various information as described above. Computer-readable storage media 1006 may store information regarding one or more processes 1008 executing on the processors 1002. The computer-readable storage media 1006 may also include memory 1010, which may include system memory, video memory, and/or a page file. A memory manager 1012 may also be encoded on the computer-readable storage media 1006 and may interact with the processes 1008 to manage memory in accordance with techniques described herein, including according to any of the exemplary techniques described above. The memory manager 1012 may also maintain records, including a record 1014 of memory space that has been offered and thus made available for discard by one or more of the processes 1008.

While not illustrated in FIG. 10, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. At least one computer-readable memory having computer-executable instructions stored therein, the computer-executable instructions for causing at least one processor of a computing device to execute a method of managing memory allocated to a process executing on the computing device, the method comprising:

notifying a memory manager of the computing device that first memory space allocated to the process contains first content available for discard; and subsequently notifying the memory manager that the process will use the first content of the first memory space.

2. The at least one computer-readable memory of claim 1, wherein the method further comprises:

in response to the subsequently notifying that the process will use the first content, receiving an indication from the memory manager of whether the first content was discarded.

3. The at least one computer-readable memory of claim 2, wherein the method further comprises:

in response to receipt of an indication from the memory manager that indicates that the first content was discarded:

regenerating the first content; and storing the regenerated first content in the first memory space.

4. The at least one computer-readable memory of claim 1, wherein notifying the memory manager that the first content is available for discard comprises:

notifying the memory manager of a priority level for the first content that is available for discard.

5. The at least one computer-readable memory of claim 1, wherein notifying the memory manager that the first content is available for discard comprises:

notifying the memory manager that memory space in video memory contains graphics data available for discard.

6. The at least one computer-readable memory of claim 5, wherein the method further comprises:

requesting that a first amount of memory space in the video memory be allocated to the process for use as a staging buffer for graphics operations of the process, and wherein:

notifying the memory manager that the first content is available for discard comprises notifying the memory manager that the staging buffer contains content available for discard.

7. The at least one computer-readable memory of claim 1, wherein notifying the memory manager that the first content is available for discard comprises:

notifying the memory manager that memory space in system memory contains data available for discard.

8. The at least one computer-readable memory of claim 1, wherein the method further comprises:

prior to notifying the memory manager that the first content is available for discard:

requesting that the first memory space be allocated to the process;

generating the first content and storing the first content in the first memory space; and using the first content.

9. A computing device having instructions stored therein for performing operations that manage memory allocated to one or more processes executing on the computing device, the operations comprising:

maintaining a record of allocated memory space for which contents of the allocated memory space are not required to be preserved, the maintenance of the record including:

removing an identifier of a first memory space from the record in response to a request from a first process to use content of the first memory space;

detecting that the computing device is experiencing memory pressure;

selecting, based on the record, a second memory space for which the content is not required to be preserved; and ceasing to preserve content of the second memory space.

10. The computing device of claim 9, wherein maintaining the record of allocated memory for which the contents are not required to be preserved further includes:

prior to the request adding the first memory space to the record in response to a notification from the first process, to which the first memory space is allocated, that the content of the first memory space is available for discard.

11. The computing device of claim 9, further comprising:

receiving a notification from the first process, to which the first memory space is allocated, that the first memory space contains content that is not required to be preserved; and following receiving the notification, maintaining a memory allocation of the first process.

12. The computing device of claim 11, wherein maintaining the memory allocation of the first process comprises, following ceasing to preserve the content of the second memory space, continuing to allocate the second memory space to the first process.

13. The computing device of claim 9, wherein detecting that the computing device is experiencing memory pressure comprises determining that a main memory of the computing device contains more than a threshold amount of content.

14. The computing device of claim 9, wherein detecting that the computing device is experiencing memory pressure comprises determining that the computing device is to undergo a power state transition.

15. The computing device of claim 9, wherein selecting the second memory space based on the record comprises selecting the second memory space from among the allocated memory space for which the contents are not required to be preserved based at least in part on a time that memory was added to the record.

16. The computing device of claim 9, wherein selecting the second memory space based on the record comprises selecting the second memory space from among the allocated memory space for which the contents are not required to be preserved based at least in part on a priority level of the content set by the first process to which the second memory space is allocated.

17. A computing device, comprising:

at least memory device; and at least one processor, wherein the at least one memory device and the at least one processor respectively store and execute instructions, including instructions that cause the at least one processor to manage memory allocated to one or more processes executing on the computing device, the management of the memory comprising:

receiving from a first process to which first memory is allocated an indication that the first memory contains first content that is available for discard;

subsequently receiving from the first process a request to use the first content of the first memory that was indicated to be available for discard;

determining whether the content of the first memory was discarded; and based on a result of the determining, responding to the request with a notification that the first content is available for use or that the first content was discarded.

18. The computing device of claim 17, wherein receiving the indication that the first memory contains first content available for discard comprises receiving a priority level of the first content available for discard.

19. The computing device of claim 17, wherein the management of the memory further comprises:

in response to receiving the indication from the first process, adding the first memory to a record of allocated memory that contains content available for discard; and in response to subsequently receiving the request to use the first content, removing the first memory from the record.

20. The computing device of claim 17, wherein receiving the indication from the first process comprises receiving, from a graphics driver, an indication that data regarding a graphic, which is stored in video memory of the computing device, is available for discard.

\* \* \* \* \*